(12) United States Patent
Kurihara et al.

(10) Patent No.: US 6,867,872 B1
(45) Date of Patent: Mar. 15, 2005

(54) IMAGE PROCESSING APPARATUS, IMAGE PROCESSING METHOD, AND IMAGE FORMING APPARATUS

(75) Inventors: Yusaku Kurihara, Ebina (JP); Makoto Sano, Ebina (JP); Shigeru Tsukimura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 780 days.

(21) Appl. No.: 09/650,670

(22) Filed: Aug. 30, 2000

(30) Foreign Application Priority Data

Oct. 5, 1999 (JP) .......................................... 11-284605

(51) Int. Cl.[7] .............................................. G06F 15/00
(52) U.S. Cl. ...................... 358/1.11; 358/1.9; 358/1.2; 358/426.01
(58) Field of Search ................................ 358/1.11, 1.9, 358/1.2, 426.01; 382/187, 311; 345/468, 501, 505

(56) References Cited

U.S. PATENT DOCUMENTS 5,414,448 A * 5/1995 Wada et al. ................ 345/658
6,055,061 A * 4/2000 Sato ......................... 358/1.11

FOREIGN PATENT DOCUMENTS

| JP | 6-186951 | 7/1994 |
| JP | 10-16319 | 1/1998 |
| JP | 10-211741 | 8/1998 |

* cited by examiner

Primary Examiner—Twyler Lamb
(74) Attorney, Agent, or Firm—Morgan Lewis & Bockius LLP

(57) ABSTRACT

The present invention provides an image processing apparatus and an image processing method that enable efficient use of code information storage areas and can rapidly process code information to render characters. A character data management unit stores reference information for referencing the shape data of a character indicated by inputted character data in an intermediate code buffer in association with an intermediate code. Thereby, a data amount of the intermediate code buffer is reduced. At the same time, reference information for referencing the intermediate code is stored in a font cache buffer in association with the character shape data. By dint of the mutual reference, when character shape data is to be saved from, e.g., the font cache buffer to the intermediate code buffer, intermediate codes referencing the shape data can be determined from reference information of the character shape data and reference information of the intermediate codes can be modified, so that processing can be performed easily and rapidly.

16 Claims, 24 Drawing Sheets

*FIG.5A*     *FIG.5B*     *FIG.5C*
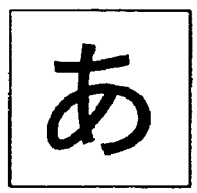 →  → 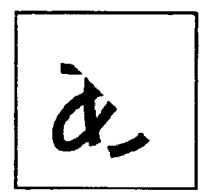

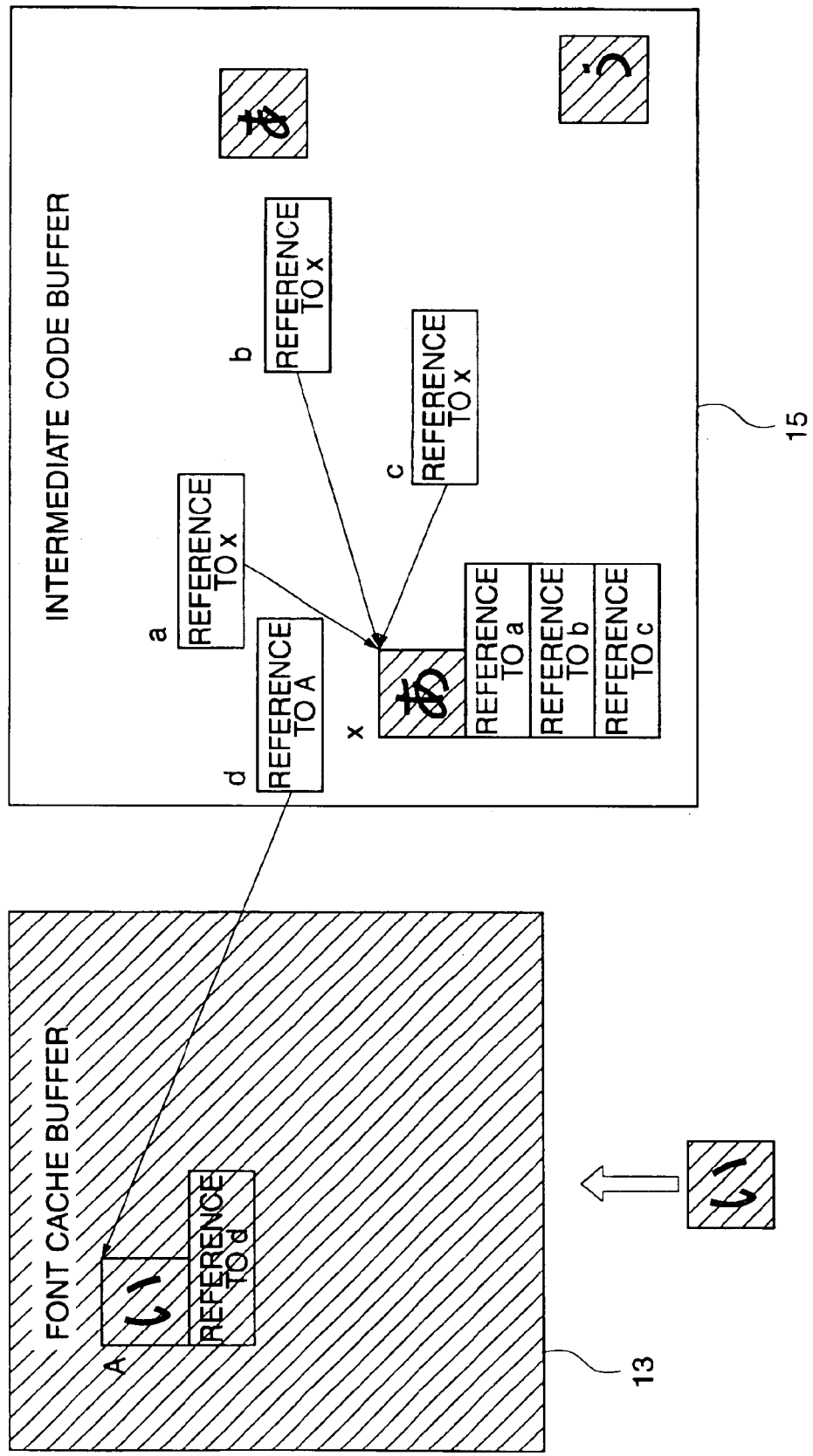

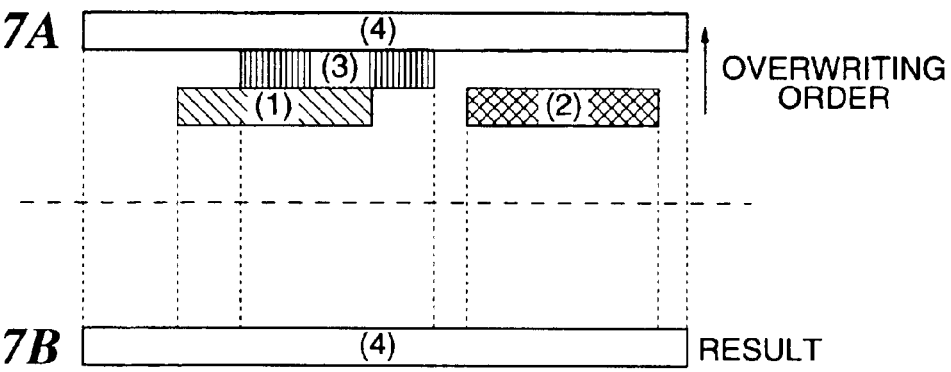
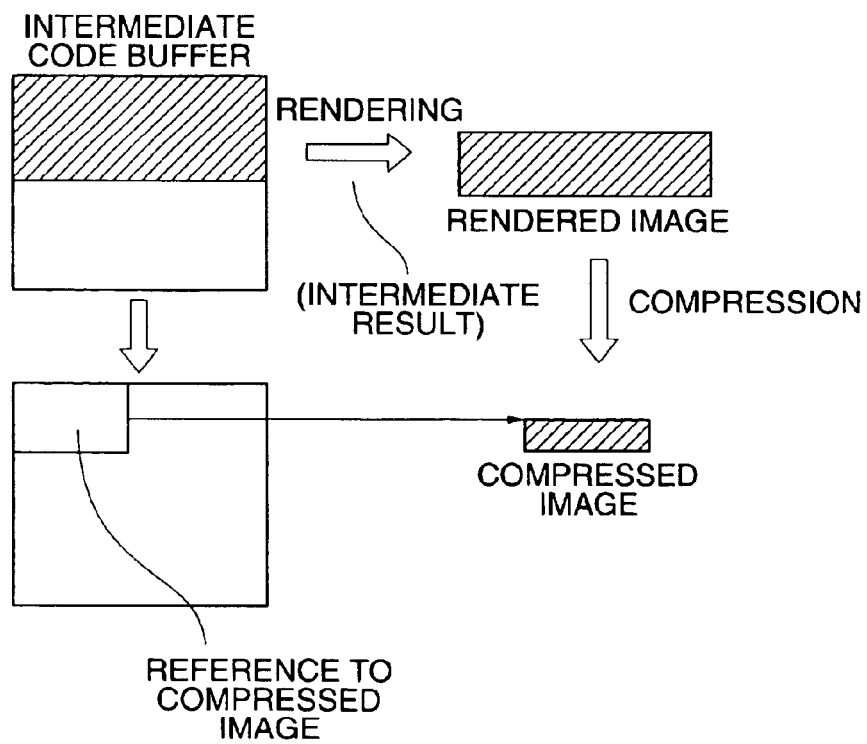

FIG.12
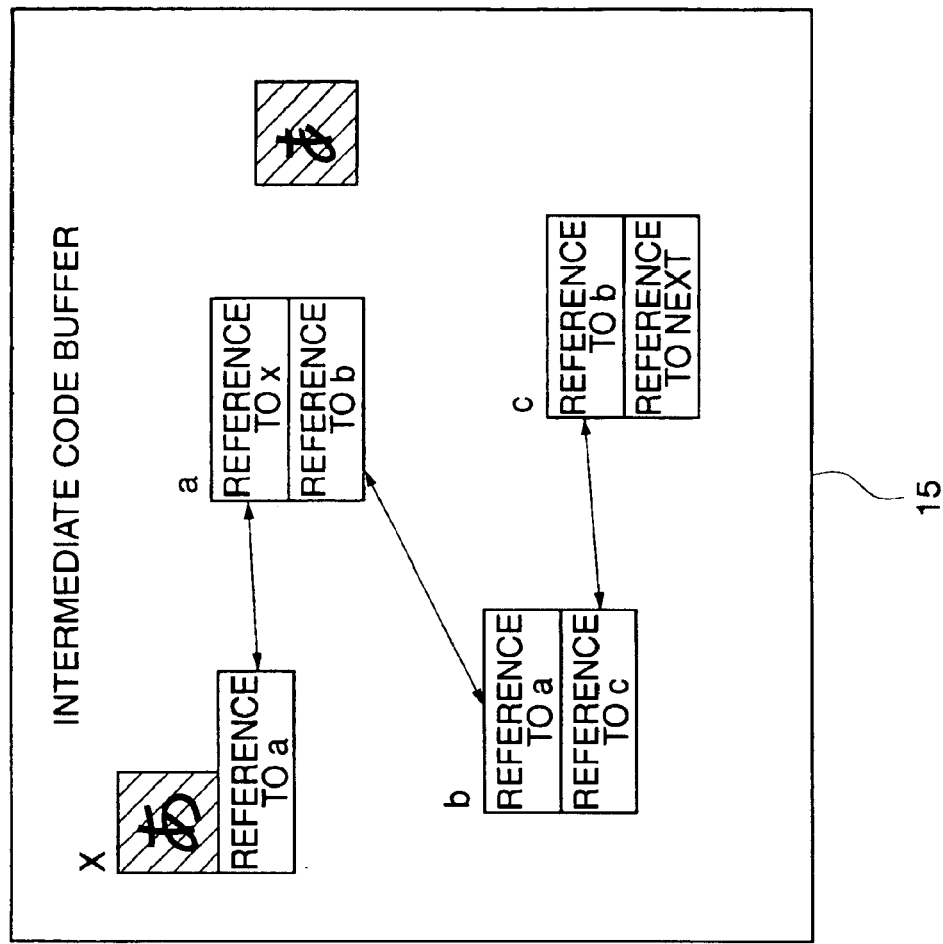
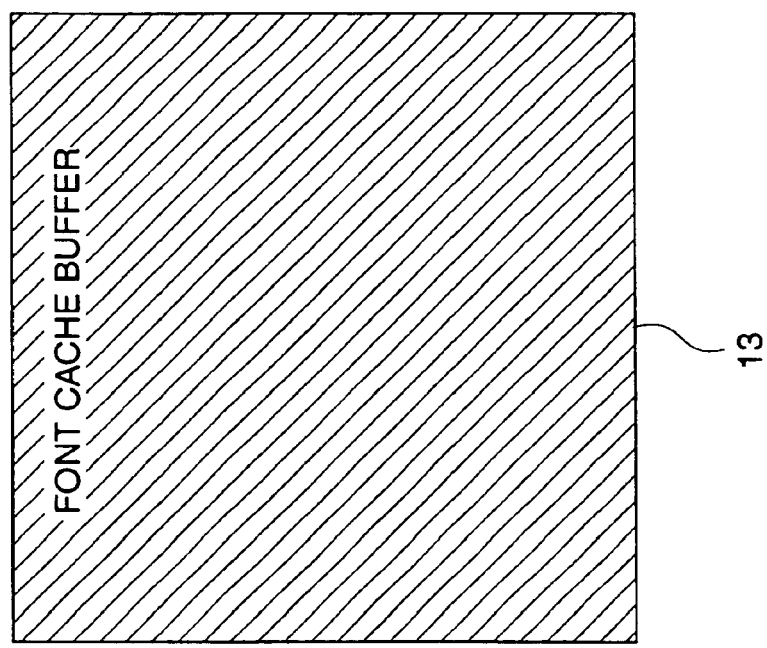

FIG.16
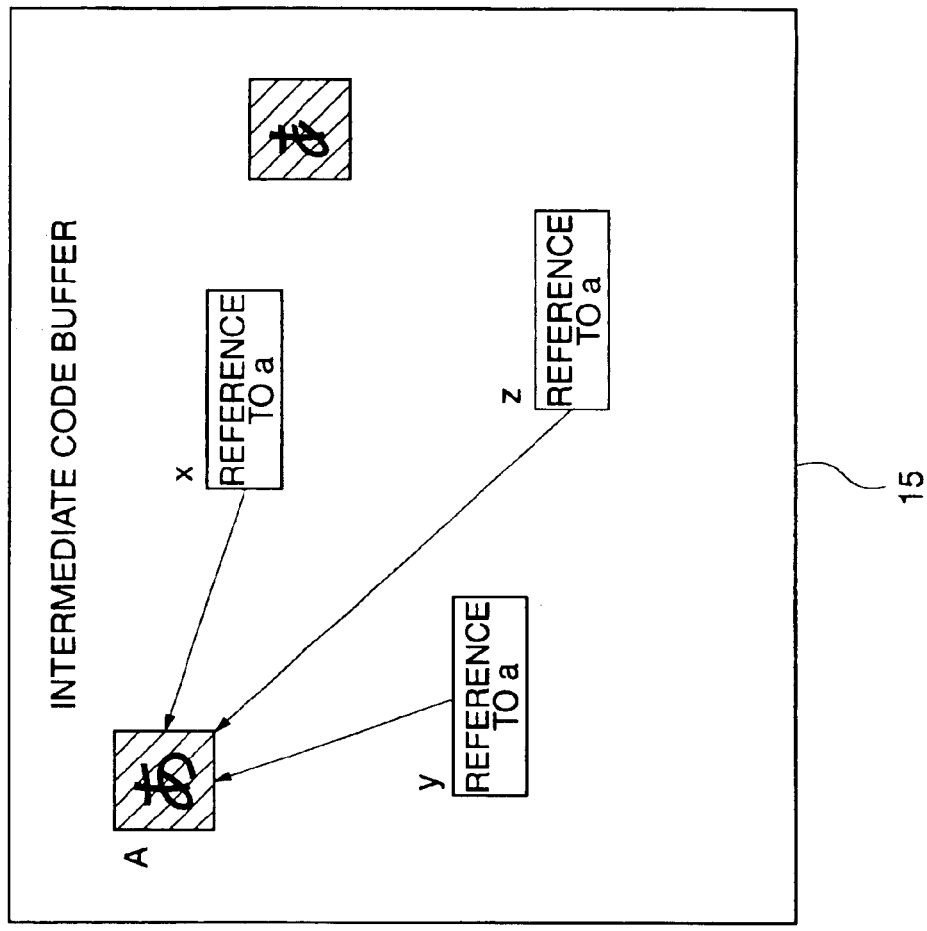
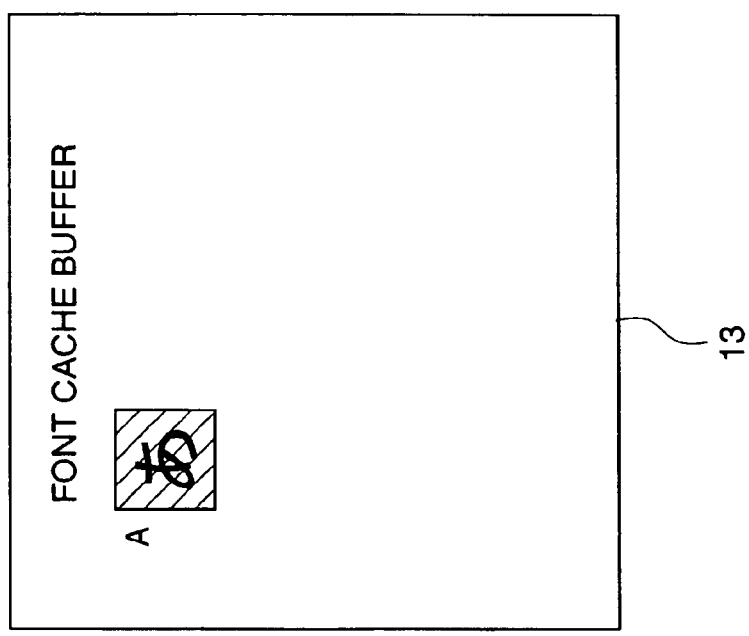

FIG.17
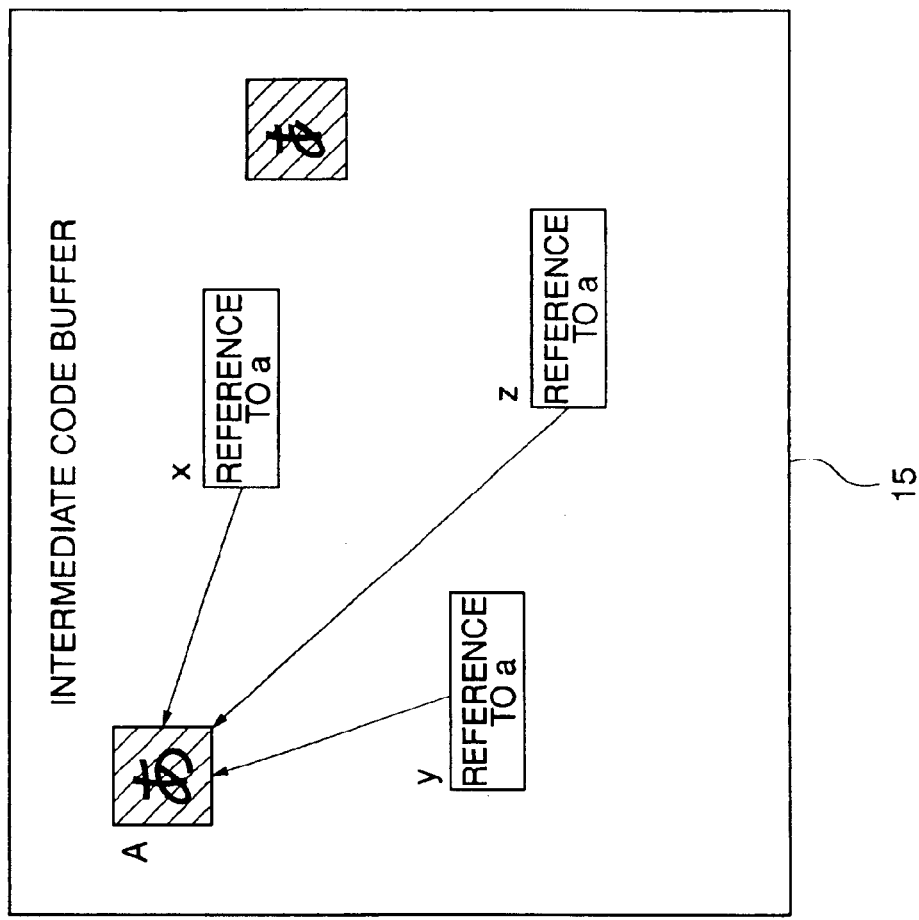
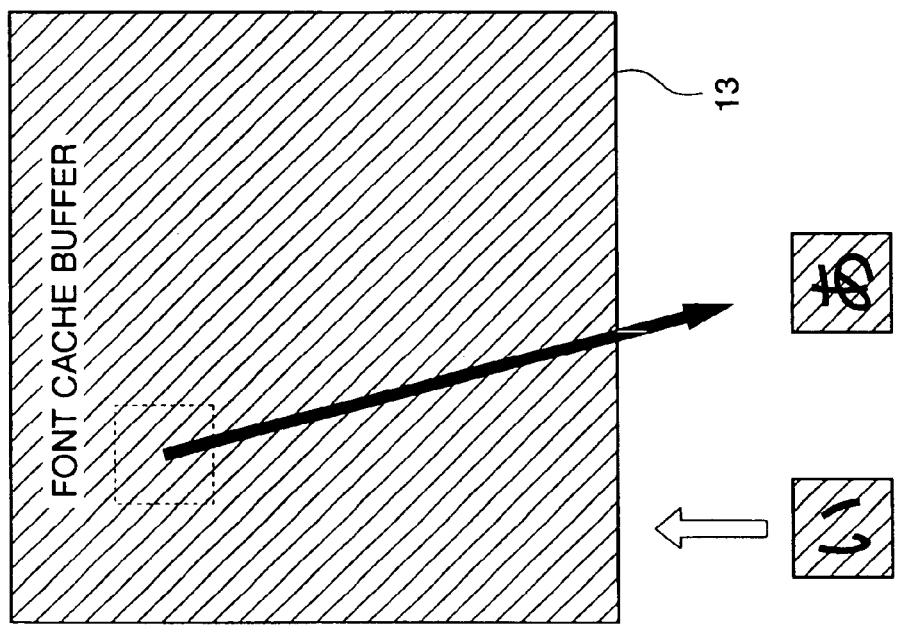

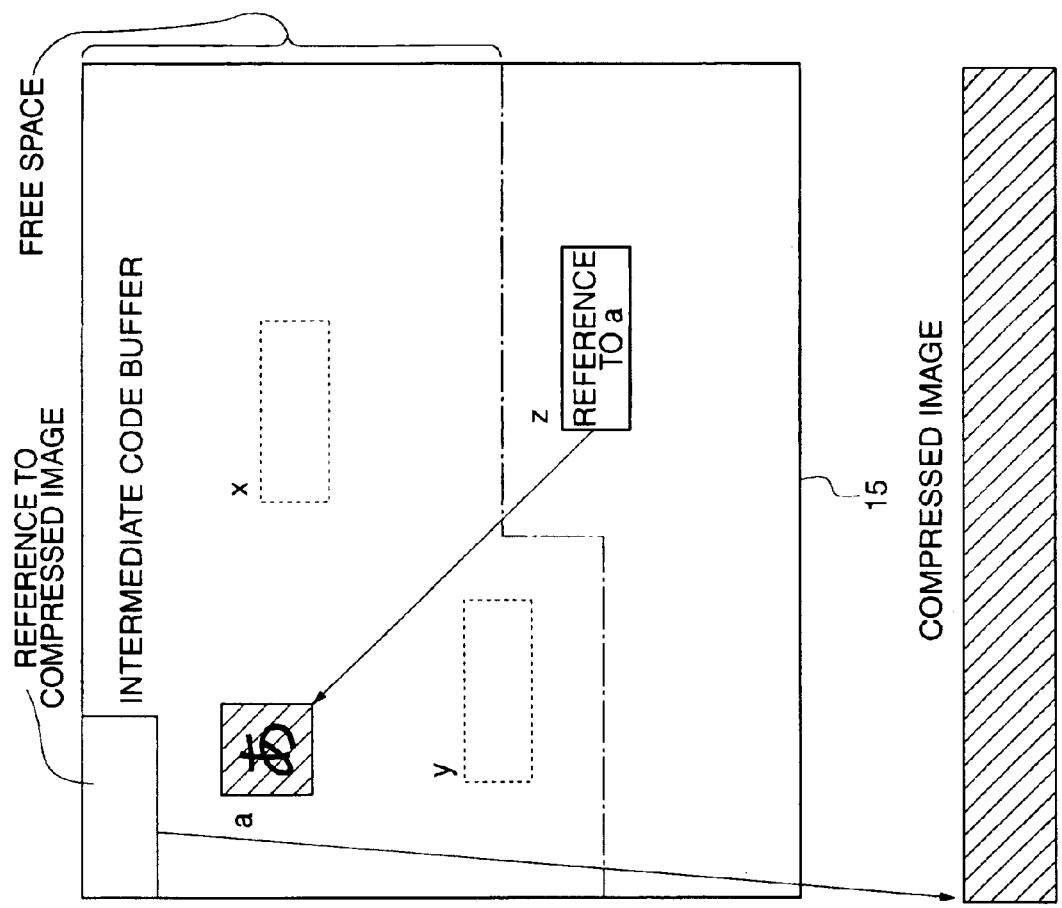
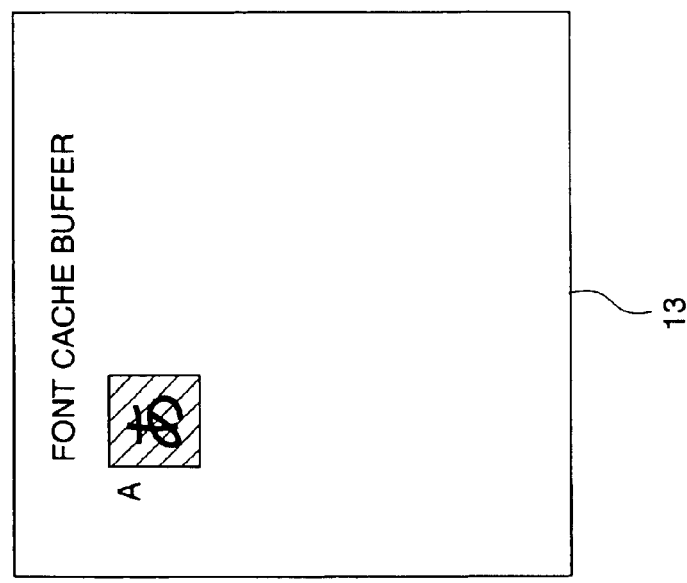
FIG.18

FIG.22
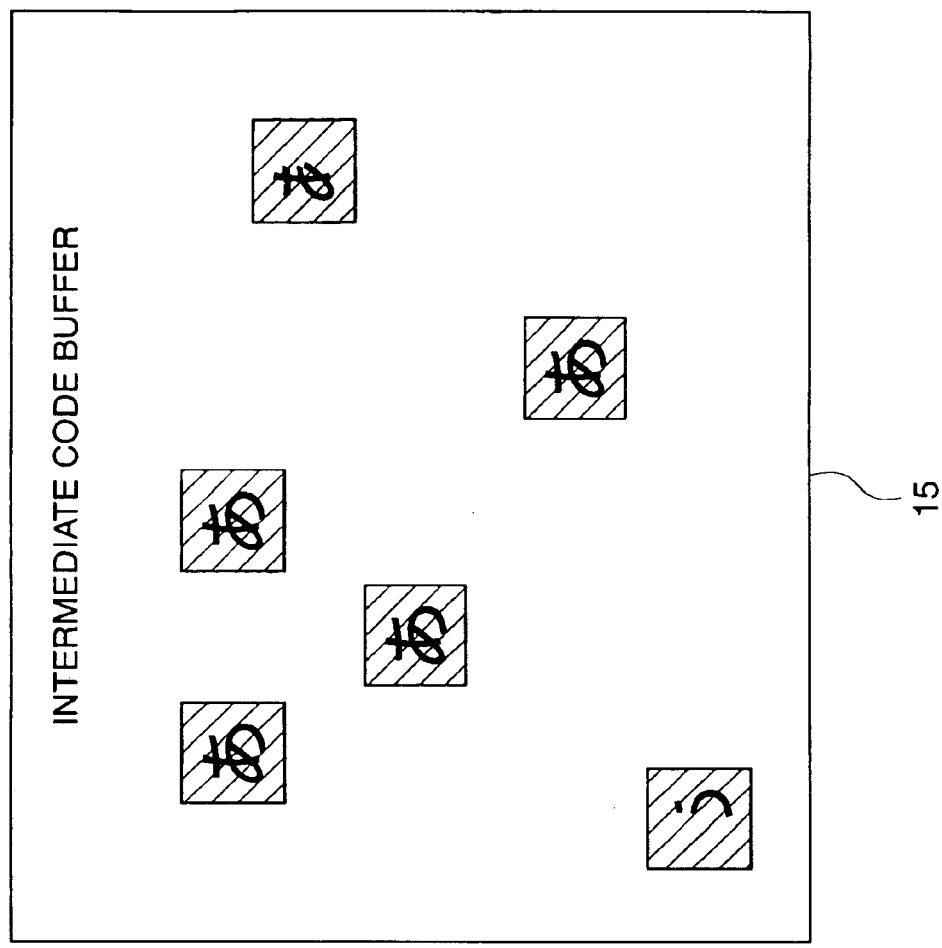
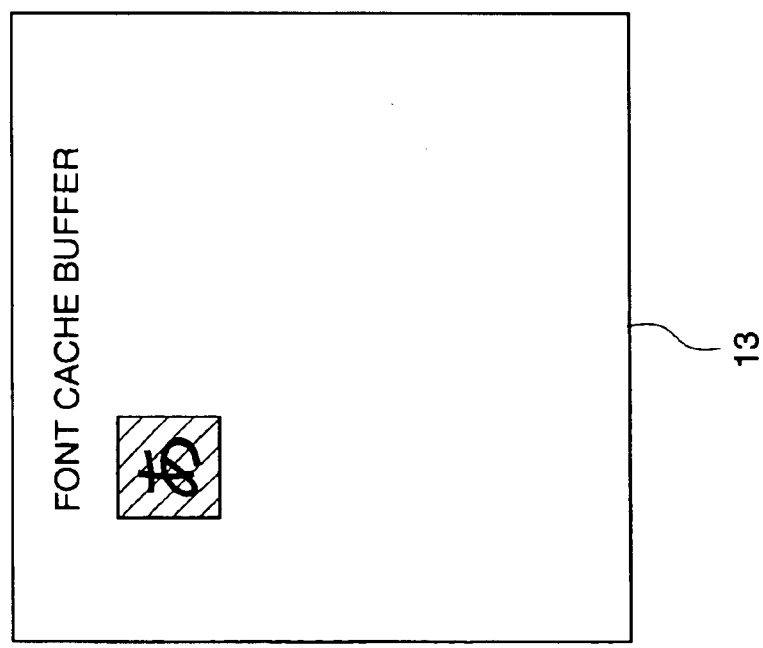

IMAGE PROCESSING APPARATUS, IMAGE PROCESSING METHOD, AND IMAGE FORMING APPARATUS

BACKGROUND OF THE INVENTION

1. Field of the Invention

The present invention relates to an image processing apparatus and image processing method that control and manage code information for rendering, particularly code information for rendering characters, and an image forming apparatus that employs the image processing apparatus and image processing method.

2. Description of the Prior Art

FIG. 19 is a block diagram showing an example of a general image forming apparatus. On the rendering, the reference numeral 1 designates an input analysis unit; 2, a character data processing unit; 3, a graphics data processing unit; 4, an image data processing unit; 5, an intermediate code processing unit; 6, a band buffer; and 7, an output unit. The input forming apparatus shown in FIG. 19 receives input data such as data described by a page description language or the like, and temporarily converts it into intermediate codes before performing rendering processing to form an image.

The input data analysis unit 1 analyzes input data described by, e.g., a page description language, and classifies it according to rendering types. Herein, the input data falls into three categories: character, graphics, and image. The classified input data is, according to the respective types, passed to the character data processing unit 2, the graphics data processing unit 3, and the image data processing unit 4.

The character data processing unit 2 converts the input data to render a character, passed from the input data analysis unit 1, into an intermediate code and outputs it to the intermediate code processing unit 5. Likewise, the graphics data processing unit 3 converts the input data to render graphics and the like, passed from the input data analysis unit 1, into an intermediate code and outputs it to the intermediate code processing unit 5. The image data processing unit 4 converts input data including the image data to render into an intermediate code and outputs it to the intermediate code processing unit 5.

The intermediate code processing unit 5 accumulates intermediate codes passed from the character data processing unit 2, the graphics data processing unit 3, and the image data processing unit 4, and when one page of intermediate codes has been accumulated, decodes the intermediate codes to perform rendering processing, and stores an image in the band buffer 6.

The output unit 7 fetches an image from the band buffer 6 and forms it on a recording medium such as recording paper.

FIG. 20 is a block diagram showing an example of the character data processing unit and the intermediate code processing unit. On the rendering, the reference numeral 11 designates a character data management unit; 12, a character data generation unit; 13, a font cache buffer; 14, an intermediate code management unit; and 15, an intermediate code buffer. Input data (hereinafter referred to as character data) classified as "character" by the input data analysis unit 1 of FIG. 19 is inputted to the character data management unit 11. Character data includes font, size, direction, character code, color, printing position, and other information.

Upon input of character data, the character data management unit 11 converts the character data into an intermediate code containing information such as the shape data and rendering position of the characters. At this time, the character data management unit 11 searches the font cache buffer 13 for the shape data of a character indicated by the character data, and if not found, requests the character data generation unit 12 to generate character shape data. The character data management unit 11 also manages the font cache buffer 13 and registers the character shape data generated by the character data generation unit 12 in the font cache buffer 13 also. At the time of registration, if there is no free space in the font cache buffer 13, character shape data registered in the font cache buffer 13 is deleted according to a predetermined algorithm to allocate a free space so that new character shape data is registered.

The character data generation unit 12 generates character shape data, based on the character data passed from the character data management unit 11. The font cache buffer 13 stores the character shape data generated by the character data generation unit 12 for reuse. By storing the character shape data in the font cache buffer 13, for the same character, character shape data need not be generated in the character data generation unit 12, so that character shape data can be rapidly obtained.

The intermediate code management unit 14 stores intermediate codes received from the character data management unit 11 and other processing units in the intermediate code buffer 15. Rendering processing is performed according to the intermediate codes stored in the intermediate code buffer 15, and a rendered image is stored in the band buffer 6. The intermediate code buffer 15 stores intermediate codes generated by an appropriate processing unit.

FIG. 21 is a flowchart showing a conventional procedure for processing character data. In S101, whether input data is character data is judged in the input data analysis unit 1, and if not character data, in step S107, processing corresponding to the type of the input data is performed in the graphics data processing unit 3 or the image data processing unit 4.

If the input data is character data, in S102, the character data management unit 11 judges whether the shape data of a character indicated by the character data is registered in the font cache buffer 13. If the shape data of a character indicated by the character data is registered in the font cache buffer 13, since the registered shape data can be read out for use, control proceeds directly to S105. If the shape data of a character indicated by the character data is not registered in the font cache buffer 13, in S103, shape data corresponding to a character indicated by the character data is generated in the character data generation unit 12. In S104, the character shape data generated in S103 is registered in the font cache buffer 13.

In S105, information such as a rendering position is included in the obtained character shape data to generate an intermediate code, which is written to the intermediate code buffer 15 by the intermediate code management unit 14.

Whether one page of input data has been processed is judged in S106, and if not so, control returns to S101 to repeat processing for the next input data. Upon termination of processing for one page of input data, processing for character data terminates. The intermediate code management unit 14 performs rendering processing, based on the intermediate codes stored in the intermediate code buffer 15, and expands an image in the band buffer 6. The image expanded in the band buffer 6 is sent to the output unit 7, where the image is formed.

FIG. 22 is a schematic diagram showing the locations of character shape data in the font cache buffer and the intermediate code buffer when the conventional procedure for processing character data is executed. If processing for the character data as shown in FIG. 21 is performed, each of the intermediate codes corresponding to the character data will hold character shape data. As a result, as shown in FIG. 22, for each of two or more occurrences of character data to render the same character, the shape data of the character will be written transferred to the intermediate code buffer 15. In FIG. 22, for a character "あ", areas to which the shape data of the same character "あ" is written are indicated in rectangular shape.

This method enables very simple rendering control because, since each of pieces of the character intermediate code data is independent and has no relation with another, the intermediate codes have only to be successively transferred for rendering processing in the case of rendering processing by, e.g. hardware. As seen from FIG. 22, since a large number of pieces of shape data of the same character may be stored in the intermediate code buffer 15, there is the problem that the intermediate code buffer is wastefully consumed. Also, each time an intermediate code indicating the same character is generated and written to the intermediate code buffer 15, shape data is transferred and written, so that it takes a long time to write the intermediate code to the intermediate code buffer 15, hampering rapid processing.

To solve such a problem, an apparatus described in Japanese Published Unexamined Patent Application No. Hei 10-16319 employs the method of not transferring, in principle, character shape data to the intermediate code buffer 15. FIG. 23 is a schematic diagram showing the locations of character shape data in the font cache buffer and the intermediate code buffer in another conventional method for processing character data. This method prevents the intermediate code buffer 15 from being wastefully consumed by placing character shape data in the font cache buffer 13 and writing information for referencing the character shape data in the font cache buffer 13 to the intermediate code buffer 15. The character shape data in the font cache buffer 13 is provided with the number of references from intermediate codes. The number of references is provided to prevent the character shape data from being deleted from the font cache buffer 13 as long as it is referenced from the intermediate codes.

FIG. 24 is a schematic diagram showing the locations of character shape data in the font cache buffer and the intermediate code buffer when there is no free space in the font cache buffer in another conventional method for processing character data. With the method of referencing shape data in the font cache buffer 13 as described above, character shape data in the font cache buffer 13 will not be deleted until no reference has been made from intermediate codes. Consequently, as the number of characters increases, the font cache buffer 13 runs out of free space. If a further character to render occurs, the font cache buffer 13 will become unavailable for registration. In such a case, as shown in FIG. 24, the shape data of a character that could not be registered is temporarily put in the intermediate code buffer 15 and intermediate codes are provided with information for referencing the character shape data temporarily put. In this way, an overflow of the font cache buffer 13 is circumvented.

FIG. 25 is a schematic diagram showing the locations of character shape data in the font cache buffer and the intermediate code buffer when a free space occurs in the font cache buffer, in another conventional method for processing character data. As shown in the above-described FIG. 24, if there is no free space in the font cache buffer 13, character shape data is temporarily put in the intermediate code buffer 15. In this state, by performing rendering processing according to intermediate codes in, e.g., the intermediate code buffer 15, a free space occurs in the font cache buffer 13. For example, in the example shown in FIG. 24, if four intermediate codes to render the character "あ" have been deleted after being processed, the number of references of the shape data of the character "あ" is set to 0. At this time, the character shape data temporarily put in the intermediate code buffer 15 is moved to the font cache buffer 13. In the example of FIG. 25, the shape data of a character "い" is moved to a free space in the font cache buffer 13. At this time, of intermediate codes stored in the intermediate code buffer 15, information for referencing the shape data of the character "い" is updated.

In this way, as soon as a free space occurs in the font cache buffer 13, the shape data of a character temporarily put in the intermediate code buffer 15 is transferred to the font cache buffer 13. Thereby, while the capacity of free space is made as large as possible, the shape data of most recent characters can always be held in the font cache buffer 13.

However, transferring character shape data from the intermediate code buffer 15 to the font cache buffer 13 requires updating information of intermediate codes having referenced the shape data. This entails searching the entire intermediate code buffer 15 for intermediate codes referencing the shape data of a character to be transferred. Therefore, there is the problem that it takes much time to transfer the character shape data from the intermediate code buffer 15 to the font cache buffer 13, hampering rapid execution of the whole character rendering processing.

In the above-described method, character shape data registered in the font cache buffer 13 occupies its space until the space is deallocated when the number of references becomes zero. Therefore, since an expelling process different from an expelling algorithm held by a character data management part of the system is performed, satisfactory result cannot be obtained. Besides, to transfer character shape data from the font cache buffer 13 to the intermediate code buffer 15, all intermediate codes stored in the intermediate code buffer 15 must be checked as described above so that, for intermediate codes referencing the shape data of the transferred character, information for referencing the shape data is updated. For this reason, there has been the problem that processing speed decreases.

SUMMARY OF THE INVENTION

The present invention has been made in view of the above circumstances and provides an image processing apparatus and an image processing method that enable efficient use of code information storage areas such as an intermediate code buffer and can rapidly process code information to render characters, and an image forming apparatus that employs such an image processing apparatus and image processing method.

A first aspect of the invention is an image processing apparatus and image processing method that, when code information indicating a character is inputted, stores reference information of shape data in a font storage part, used to reference the shape data of the character indicated by the code information, in a code information storage part, and stores reference information pointing to code information referencing the shape data of the character in the font storage part in association with the shape data of the character.

Thereby, code information indicating individual characters forms a data structure for references to and from the shape data of the characters. Therefore, for example, even if character shape data is transferred from the code information storage part to the font storage part or from the font storage part to the code information storage part, by following the mutual references, reference information in code information referencing the transferred shape data can be easily changed. This enables rapid transfer of the character shape data between the code information storage part and the font storage part and contributes to speedup of the entire processing along with efficient use of the font storage part.

A second aspect of the invention is the image processing apparatus and image processing method that, when code information indicating a character is inputted, stores reference information of shape data in the font storage part, used to reference the shape data of the character indicated by the code information, in the code information storage part in association with the code information, and stores reference information pointing to code information referencing the shape data of the character in the font storage part in association with the shape data of the character. Thereby, mutual references are achieved between character shape data and intermediate codes referencing the character shape data. Moreover, when another piece of code information indicating the same character as the character indicated by the code information is already stored in the code information storage part, according to reference information stored in the font storage part in association with the character shape data, while reference information associated with earlier code information is changed to reference information pointing to later code information, the reference information pointing to the earlier code information is stored in the code information storage part in association with the earlier code information. Thereby, a mutual reference list can be formed in which the character shape data is used as a node at one end and code information referencing the character shape data is used as middle nodes and a node at the other end. For example, even if the character shape data is transferred from the code information storage part to the font storage part or from the font storage part to the code information storage part, changes have only to be made on reference information stored in association with the character shape data and reference information of code information in mutual reference relation with the shape data. This enables rapid transfer of the character shape data between the code information storage part and the font storage part and contributes to speedup of the entire processing along with efficient use of the font storage part.

A third aspect of the invention is the image processing apparatus and image processing method that, when code information indicating a character is inputted, if the shape data of the character indicated by the code information does not exist in the code information storage part, while the shape data is stored in the code information storage part, reference information pointing to the shape data is stored in association with the code information. If the shape data of the character indicated by the code information is already stored in the code information storage part, reference information pointing to the shape data already stored is stored in association with the code information. Also in the case where character shape data is thus put in the code information storage part, by associating the code information with the reference information pointing to the character shape data, a data amount in the code information storage part can be reduced, so that the code information storage part can be effectively used.

BRIEF DESCRIPTION OF THE DRAWINGS

Preferred embodiments of the present invention will be described in detail based on the followings, wherein:

FIGS. 5A to 5C illustrate an example of clipping;

FIG. 6 illustrates an example of the relationship between character shape data stored in the font cache buffer and intermediate codes stored in the intermediate code buffer after expelling processing in the first embodiment of the image processing apparatus and image processing method of the present invention;

FIGS. 7A to 7B illustrate a first example of fallback processing;

FIG. 8 illustrates a second example of fallback processing;

FIG. 12 illustrates an example of the relationship between character shape data stored in the font cache buffer and intermediate codes stored in the intermediate code buffer after expelling processing in the second embodiment of the image processing apparatus and image processing method of the present invention;

FIG. 16 illustrates an example of the relationship between character shape data stored in the font cache buffer and intermediate codes stored in the intermediate code buffer in the third embodiment of the image processing apparatus and image processing method of the present invention;

FIG. 17 illustrates an example of the relationship between character shape data stored in the font cache buffer and intermediate codes stored in the intermediate code buffer after expelling processing in the third embodiment of the image processing apparatus and image processing method of the present invention;

FIG. 18 illustrates an example of the relationship between character shape data stored in the font cache buffer and intermediate codes stored in the intermediate code buffer after fallback processing in the third embodiment of the image processing apparatus and image processing method of the present invention;

FIG. 22 is a schematic diagram showing the locations of character shape data in the font cache buffer and the intermediate code buffer when the conventional procedure for processing character data is executed;

DESCRIPTION OF THE PREFERRED EMBODIMENTS

Figure 1:
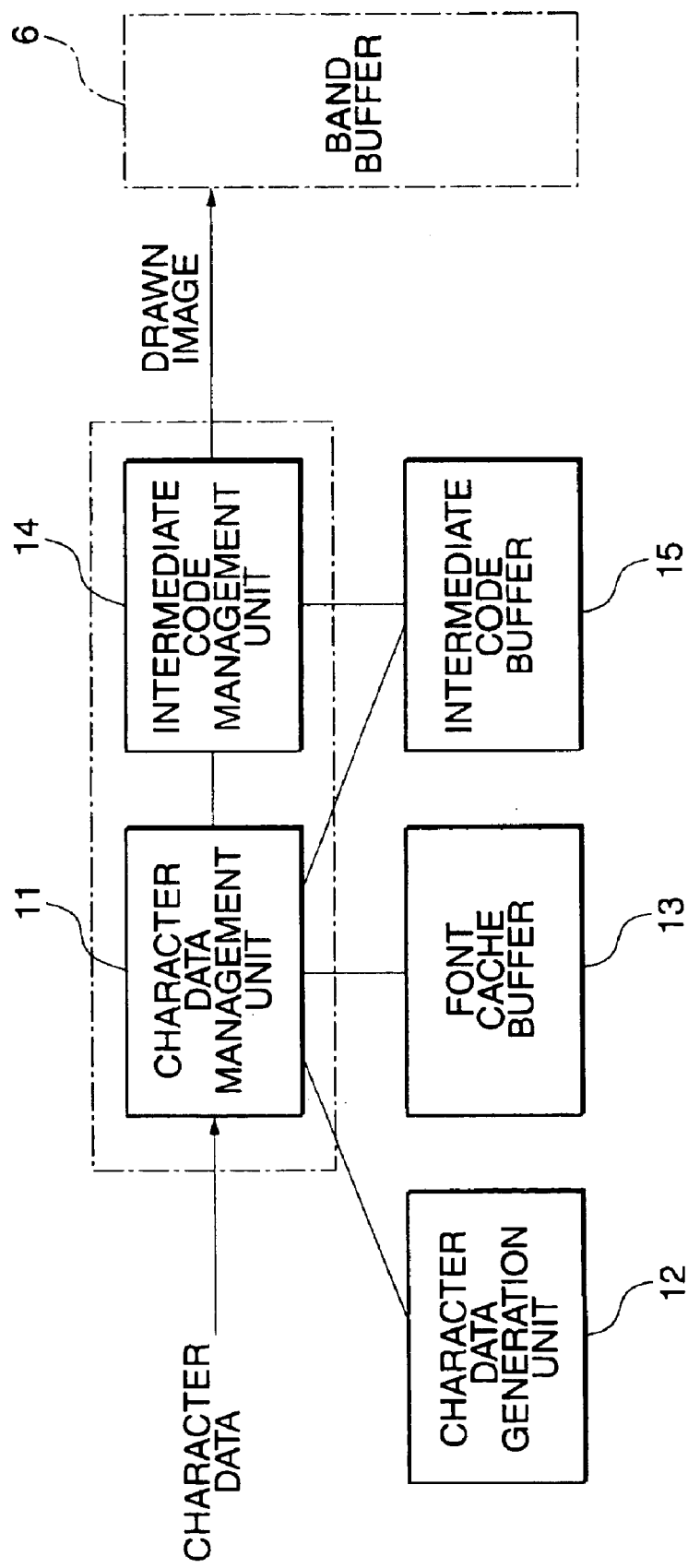
FIG. 1 is a block diagram showing a first embodiment of an image processing apparatus of the present invention.
Figure 20:
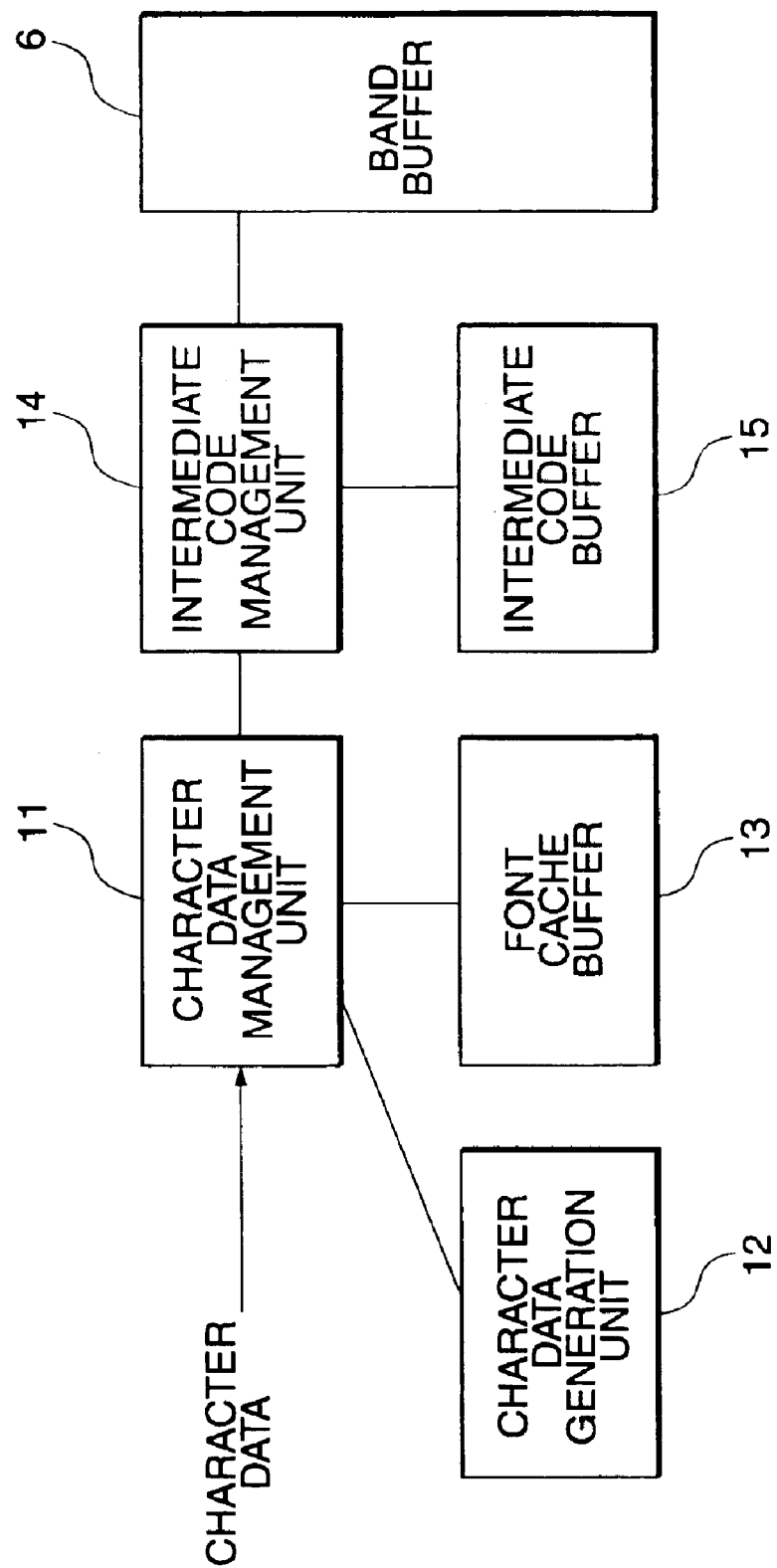
FIG. 20 is a block diagram showing an example of a character data processing unit and an intermediate code processing unit.
Figure 21:
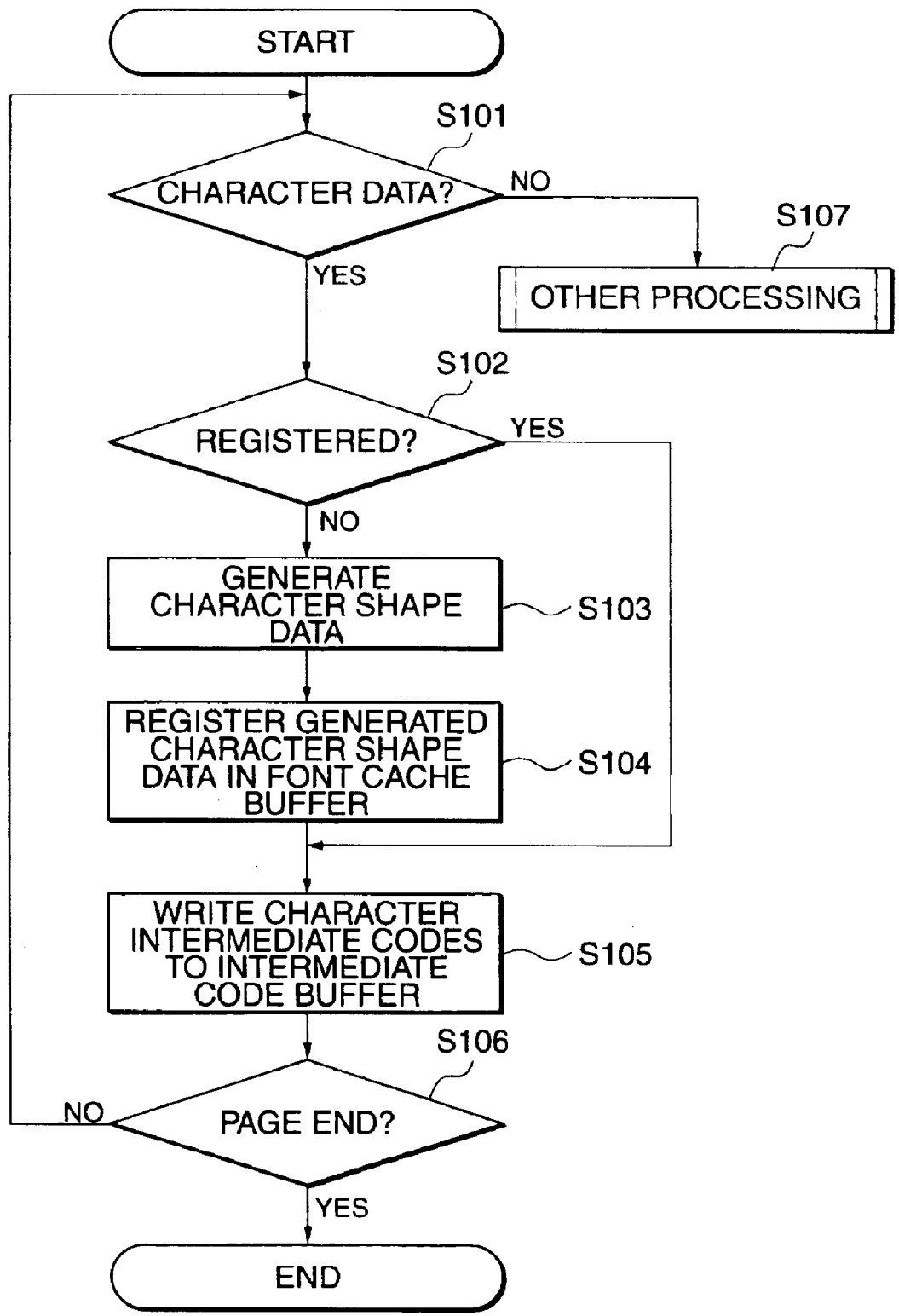
FIG. 21 is a flowchart showing a conventional procedure for processing character data.
Figure 23:
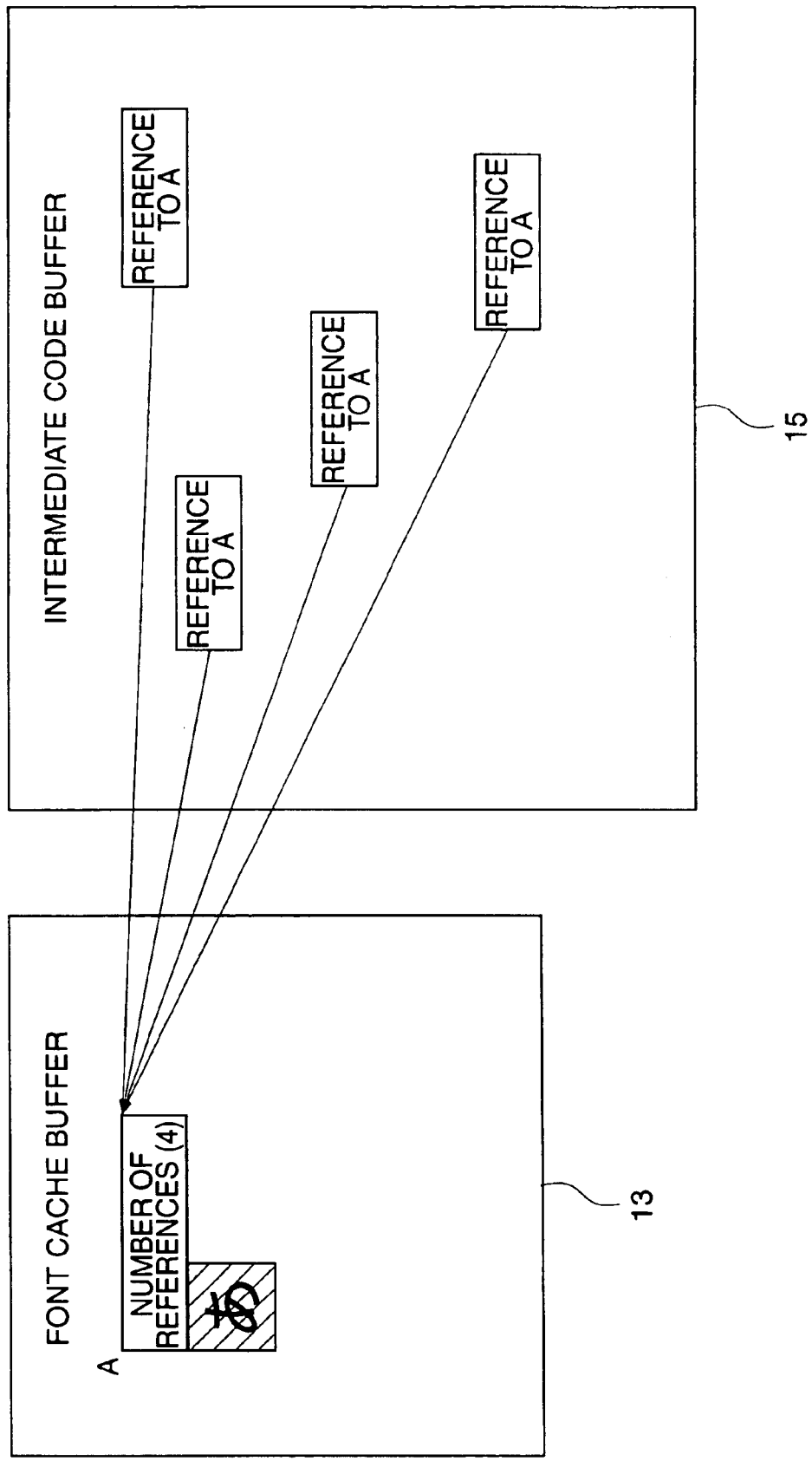
FIG. 23 is a schematic diagram showing the locations of character shape data in the font cache buffer and the intermediate code buffer in another conventional method for processing character data.
Figure 24:
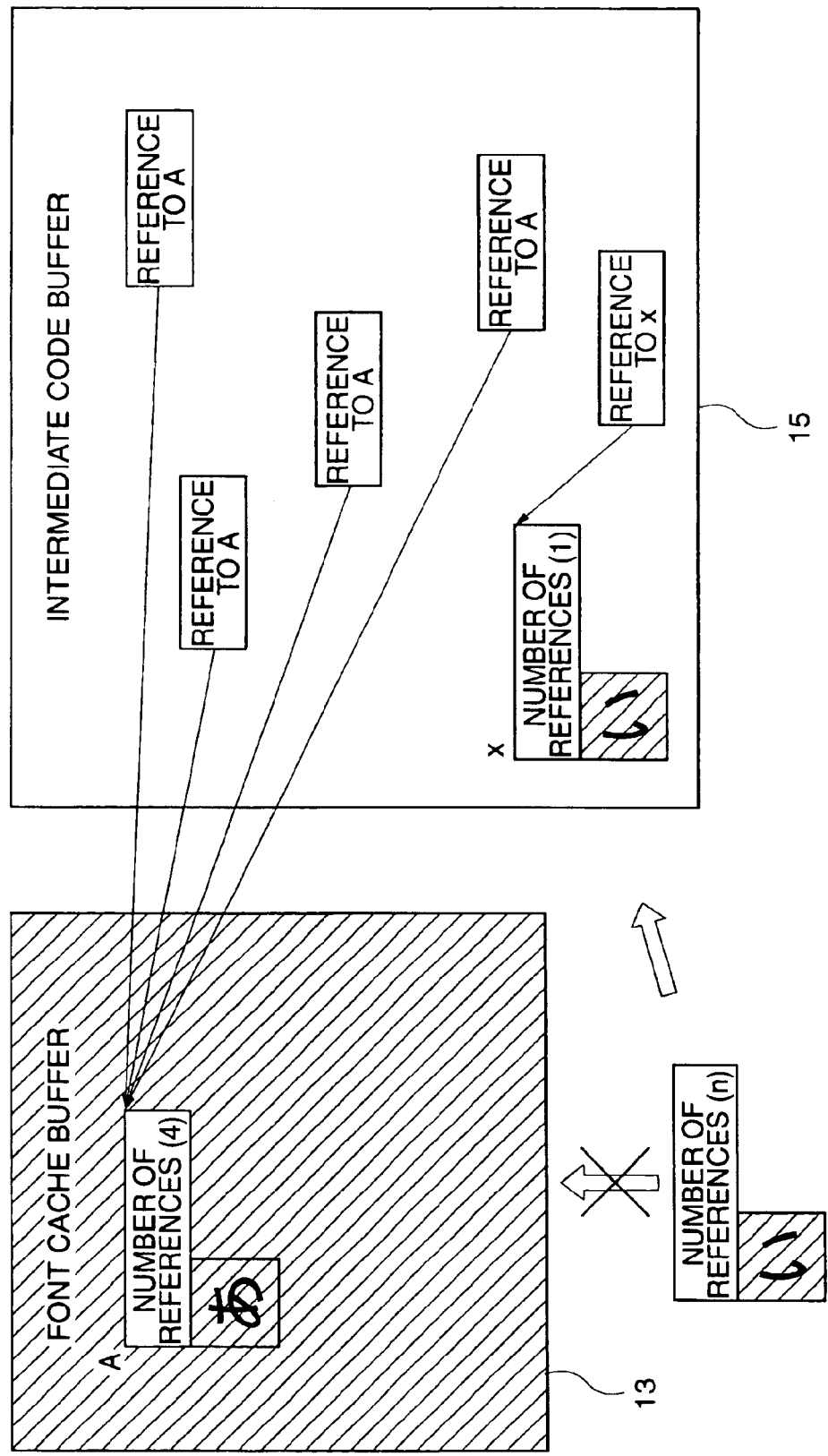
FIG. 24 is a schematic diagram showing the locations of character shape data in the font cache buffer and the intermediate code buffer when there is no free space in the font cache buffer in another conventional method for processing character data.
Figure 25:
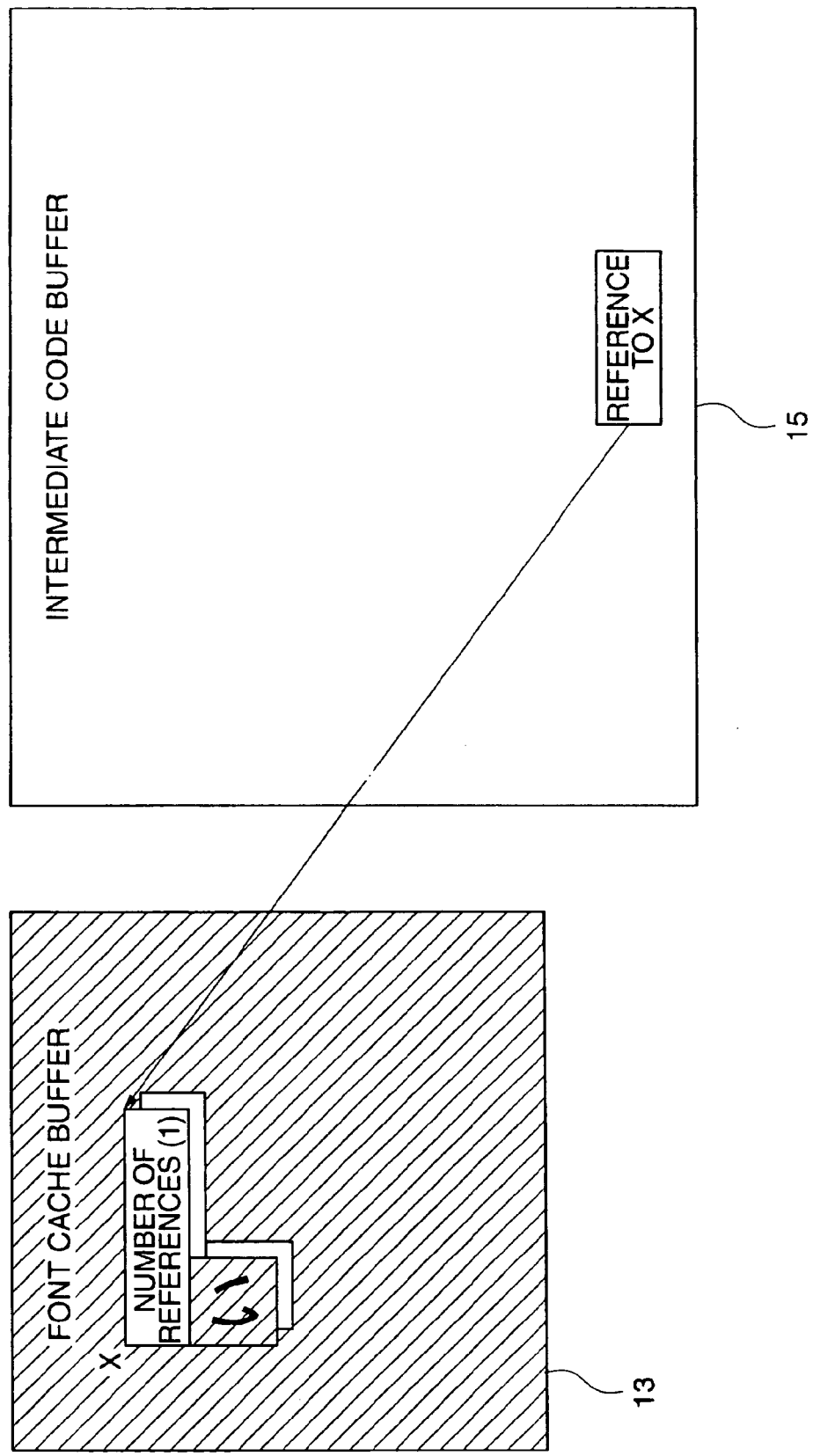
FIG. 25 is a schematic diagram showing the locations of character shape data in the font cache buffer and the intermediate code buffer when a free space occurs in the font cache buffer, in another conventional method for processing character data.

FIG. 1 is a block diagram showing a first embodiment of an image processing apparatus of the present invention. Reference numbers in the figure are the same as those of FIG. 20. FIG. 1 also shows a configuration for implementing a first embodiment of an image processing method of the present invention. A character data management unit 11 and an intermediate code management unit 14 form a management part. An intermediate code buffer 15 forms a code information storage part; a font cache buffer 13, a font storage part; and a character data generation unit 12, a character data generation part. Character data in FIG. 1 may be input data to render characters as described above or data corresponding to the above-described intermediate codes. Intermediate codes in FIG. 1 correspond to code information.

When character data is inputted, the character data management unit 11 searches the font cache buffer 13 for the shape data of a character indicated by the character data. If it exists, the character data management unit 11 adds reference information pointing to the character shape data in the font cache buffer 13 to an intermediate code and passes the intermediate code to the intermediate code management unit 14. Reference information pointing to the intermediate code is obtained from the intermediate code management unit 14 and the obtained reference information is added to the shape data of the corresponding character in the font cache buffer 13. In this way, the shape data of a corresponding character in the font cache buffer 13 is associated with reference information of all intermediate codes referencing the shape data.

If the shape data of the character indicated by the character data does not exist in the font cache buffer 13, the shape data of characters saved in the intermediate code buffer 15 is searched as described later. Also in this case, reference information pointing to the shape data of a character saved in the intermediate code buffer 15 is added to the intermediate code and the intermediate code is passed to the intermediate code management unit 14. Reference information pointing to the intermediate code is obtained from the intermediate code management unit 14 and the obtained reference information is added to the shape data of the corresponding character in the intermediate code buffer 15. In this way, the shaped data of a corresponding character in the intermediate code buffer 14 is also associated with reference information of all intermediate codes referencing the shape data.

If the shape data of the character indicated by the character data exists neither in the font cache buffer 13 nor in the intermediate code buffer 15, the character data management unit 11 requests the character data generation unit 12 to generate character shape data. Generated character shape data is basically stored in the font cache buffer 13. If the generated character shape data cannot be stored because there is no free space in the font cache buffer 13, character shape data to be saved to the intermediate code buffer 15 is selected according to a predetermined procedure, and the selected character shape data is saved to the intermediate code buffer 15. If the saved character shape data is newly generated data, processing is performed as in the above-described case where character shape data exists in the intermediate code buffer 15. Character shape data to be saved to the intermediate code buffer 15 can be saved while holding the same font, character code, and other information as it had when stored in the font cache buffer 13. When character shape data having existed in the font cache buffer 13 is saved to the intermediate code buffer 15, a free space is allocated by expelling the character shape data as described later, and then character shape data newly generated is stored in the font cache buffer 13 so that processing is performed as in the above-described case where character shape data exists in the font cash buffer 13.

The intermediate code management unit 14 stores an intermediate code passed from the character data management unit 11 and intermediate codes passed from other processing parts in the intermediate code buffer 15. When storing the intermediate code passed from the character data management unit 11 in the intermediate code buffer 15, the intermediate code management unit 14 returns reference information pointing to the intermediate code to the character data management unit 11. If the intermediate code buffer 15 runs out of free space, a free space is generated in the intermediate code buffer 15 by performing fallback processing described later. After character rendering processing is performed according to the intermediate code stored in the intermediate code buffer 15, information about reference to the intermediate code, added to the character shape data, is updated. Or information about reference to intermediate codes, added to the character shape data, may be initialized in a rendering unit such as one page and one band. At this time, initialization processing may be performed in conjunction with the character data management unit 11.

Figure 2:
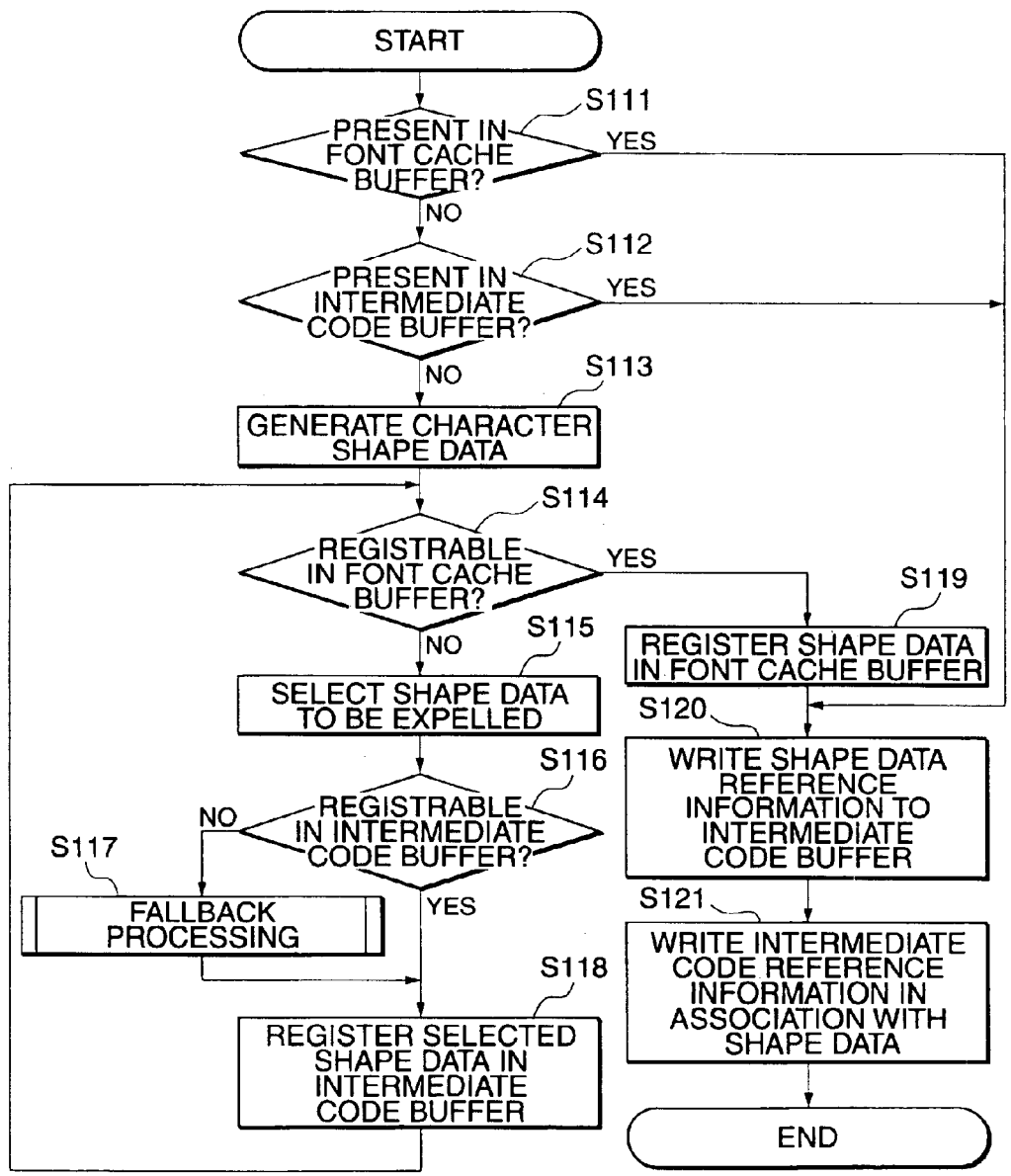
FIG. 2 is a flowchart showing an example of the operation of the image processing apparatus of the present invention in the first embodiment.

FIG. 2 is a flowchart showing an example of the operation of the image processing apparatus of the present invention in the first embodiment. FIG. 2 also shows the first embodiment of the image processing method of the present invention. When character data is inputted to the character data management unit 11, in S111, the font cache buffer 13 is searched for the shape data of a character indicated by the character data. If a match is found, control proceeds to S120, where reference information for referencing the found character shape data is written to the intermediate code buffer 15 along with an intermediate code via the intermediate code management unit 14. Furthermore, in S121, reference information for referencing the intermediate code written to the intermediate code buffer 15 is written to the font cache buffer 13 in association with the found character shape data.

If the shape data of the character indicated by the inputted character data does not exist in the font cache buffer 13, in S112, the intermediate code buffer 15 is searched for the character shape data. By adding character code, font, and other information to character shape data existing in the intermediate code buffer 15 as in the case where it exists in the font cache buffer 13, character shaped data in the intermediate code buffer 15 can be easily searched.

If a match exists in the intermediate code buffer 15, control proceeds to S120, where reference information for referencing the found character shape data is written to the intermediate code buffer 15 along with the intermediate code via the intermediate code management unit 14. Furthermore, in S121, reference information for referencing the intermediate code written to the intermediate code buffer 15 is written to the intermediate code buffer 15 in association with the found character shape data.

If the shape data of the character indicated by the inputted character data exists neither in the font cache buffer 13 nor in the intermediate code buffer 15, in S113, the shape data of the character indicated by the character data is generated in the character data generation unit 12. In S114, it is determined whether the character shape data newly generated can be registered in the font cache buffer 13. If the font cache buffer 13 has a free space so that the character shape data newly generated can be registered, in S119, the character shape data newly generated is registered in the font cache buffer 13. Control proceeds to S120, where reference information for referencing the character shape data registered in the font cache buffer 13 is written to the intermediate code buffer 15 along with the intermediate code via the intermediate code management unit 14. Furthermore, in S121, reference information for referencing the intermediate code written to the intermediate code buffer 15 is written to the font cache buffer 13 in association with the character shape data registered in the font cache buffer 13.

If the font cache buffer 13 has no free space large enough to register the character shape data newly generated, in S115 to S118, expelling processing is performed to save character shape data from the font cache buffer 13 to the intermediate code buffer 15. In S115, from character shape data already registered in the font cache buffer 13, character shape data to be saved to the intermediate code buffer 15 is selected by a predetermined method.

In S116, it is determined whether the character shape data selected in S115 can be saved to the intermediate code buffer 15. If the character shape data cannot be saved to the intermediate code buffer 15 because it has no free space large enough to store the character shape data, in S117, fallback processing is performed to create a free space in the intermediate code buffer 15. The fallback processing will be described later.

When a free space exists in the intermediate code buffer 15 or after a free space is allocated by the fallback processing in S117, in S118, the character shape data selected in S115 is transferred to the intermediate code buffer 15. The character shape data may be saved to the intermediate code buffer 15 while holding the same font, character code, and other information as it had when stored in the font cache buffer 13. Thereby, character shape data in the intermediate code buffer 15 can be easily searched. Control returns to S114, where the capacity of free space in the font cache buffer 13 is checked. If the capacity of free space is still insufficient, the processing in S115 to S118 is repeated.

If the font cache buffer 13 has obtained the capacity of free space large enough to register the character shape data newly generated, in S119, the character shape data newly generated is registered in the font cache buffer 13. In S120, reference information for referencing the character shape data newly registered in the font cache buffer 13 is written to the intermediate code buffer 15 along with the intermediate code via the intermediate code management unit 14. Furthermore, in S121, reference information for referencing the intermediate code written to the intermediate code buffer 15 is written to the font cache buffer 13 in association with the character shape data newly registered in the font cache buffer 13.

In this way, the intermediate code for the inputted character data is stored in the intermediate code buffer 15 in association with the shape data of the character indicated by the character data. Although, in the above-described expelling processing, character shape data to be expelled to the intermediate code buffer 15 was selected from those already registered in the font cache buffer 13, character shape data newly generated may also participate in the selection. Character shape data to be expelled to the intermediate code buffer 15 can be selected using any of conventionally proposed techniques. Although not shown in the above-described flowchart, if the intermediate code buffer 15 has no free space not only when character shape data is stored in the intermediate code buffer 15 but also when data is written to the intermediate code buffer 15, fallback processing is performed in S117 to increase the capacity of free space in the intermediate code buffer 15.

Figure 3:
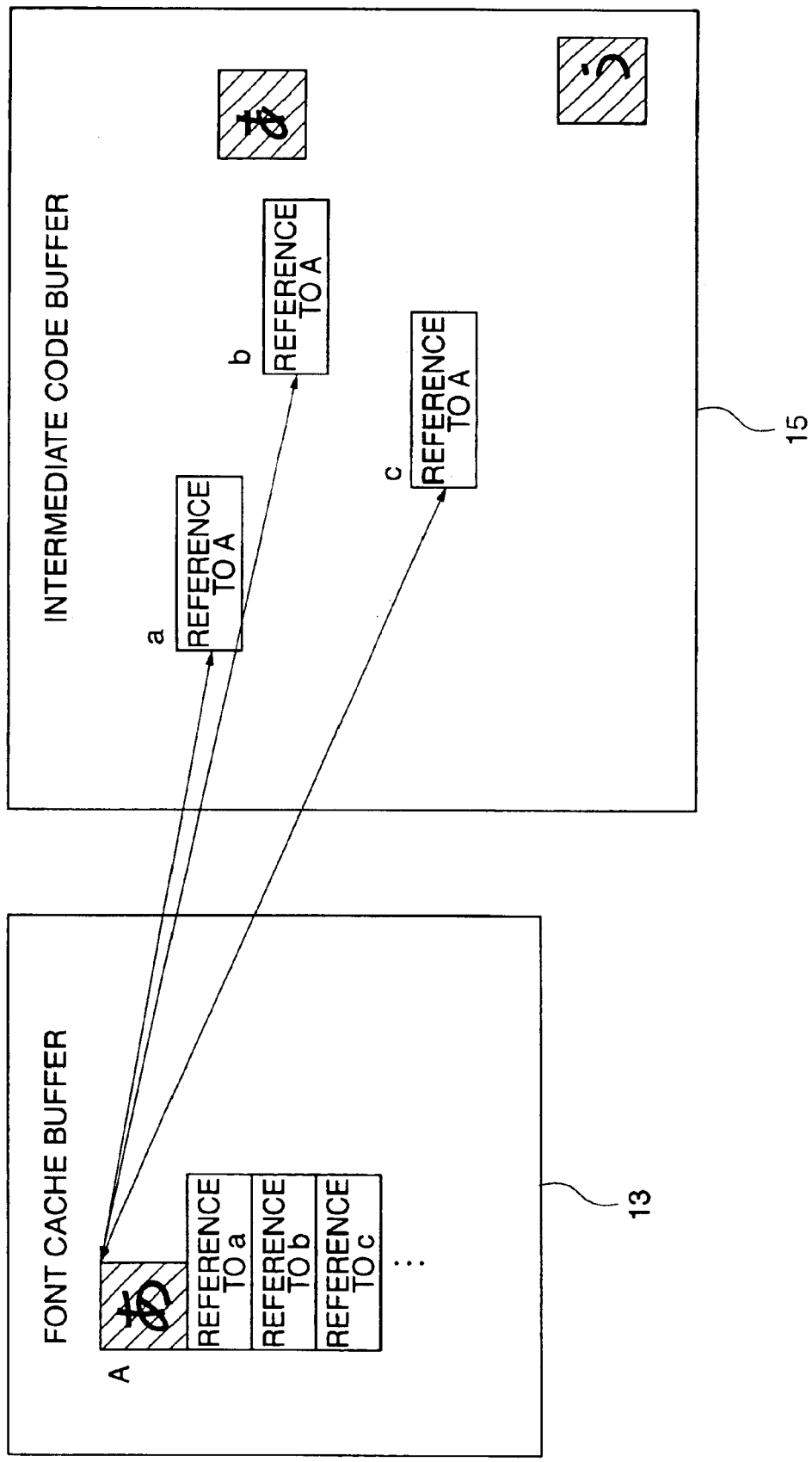
FIG. 3 illustrates an example of the relationship between character shape data stored in a font cache buffer and intermediate codes stored in an intermediate code buffer in the first embodiment of the image processing apparatus and image processing method of the present invention.

FIG. 3 illustrates an example of the relationship between character shape data stored in the font cache buffer and intermediate codes stored in the intermediate code buffer in the first embodiment of the image processing apparatus and image processing method of the present invention. As described in S120 and S121 of FIG. 2, while reference information for referencing character shape data is written to the intermediate code buffer, reference information for referencing an intermediate code referencing the shape data is written in association with the character shape data. For example, as shown in FIG. 3, when an intermediate code stored at address a of the intermediate code buffer 15 is a code to render a character "あ" the address A where the shape data of the character "あ" registered in the font cache buffer 13 is stored is written to the intermediate code as reference information. At the same time, information about reference to intermediate codes referencing the shape data, e.g., address a, address b, and address c, is written to the shape data of the character "あ" in association with the shape data. This enables mutual references between the character shape data and the intermediate codes.

For example, if character data to render the character "あ" is newly inputted, the address A for referencing the shape data of the character "あ" in the font cache buffer 13 is added to an intermediate code corresponding to the inputted character data and written to the intermediate code buffer 15.

At the same time, the address where the intermediate code is written, is additionally written, as reference information, in association with the shape data of the character "あ" in the font cache buffer 13.

Figure 4:
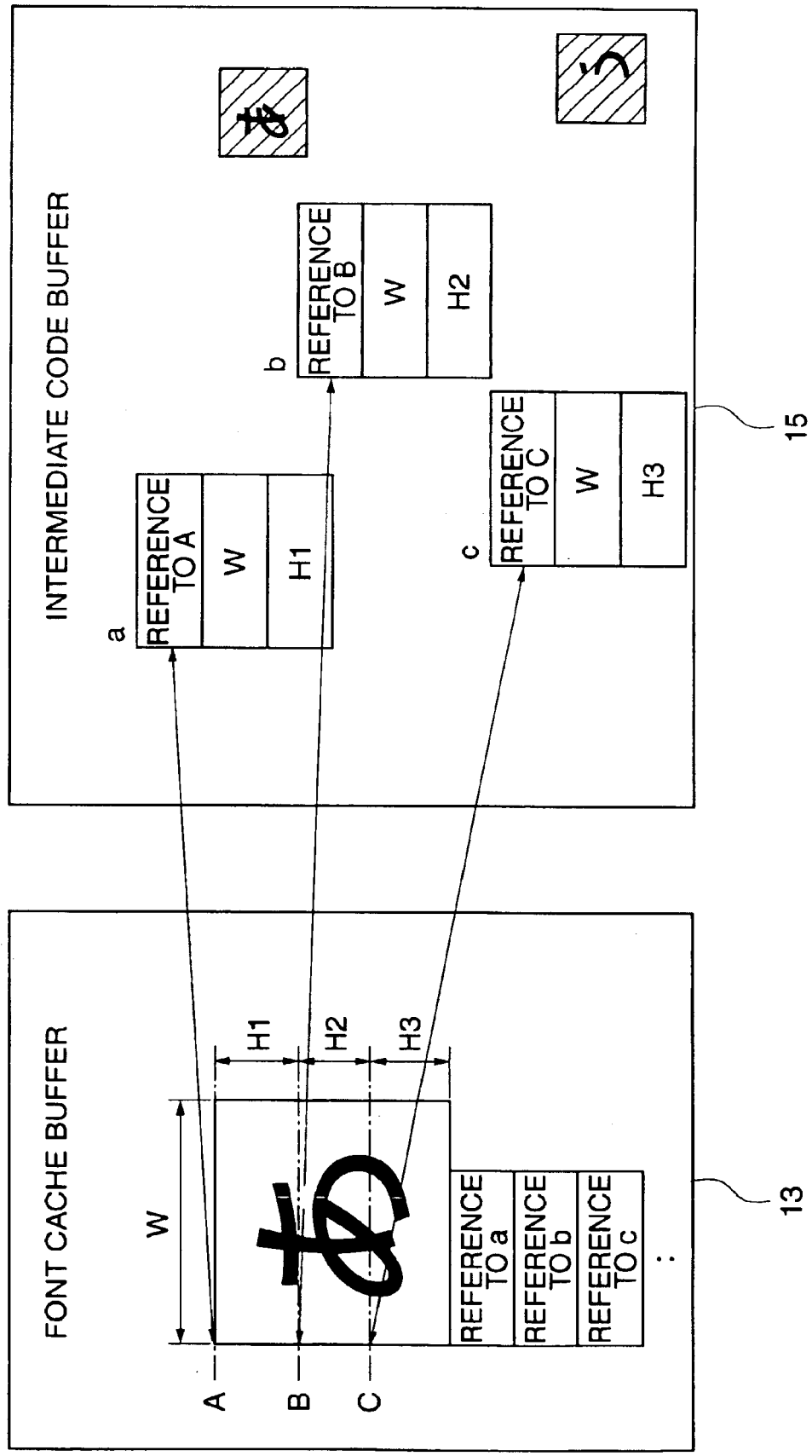
FIG. 4 illustrates an example of data held in intermediate codes when the shape of a character crosses a band boundary.

FIG. 4 illustrates an example of data held in intermediate codes when the shape of a character crosses a band boundary. Where the shape of a character crosses a band boundary, for portions of a character shape split on band boundaries, information about reference to the start of each portion and size information such as the width and height of each of portions contained in the band are put in intermediate codes. In the example shown in FIG. 4, for example, an intermediate code stored at address a indicates that only a portion of height H1 from the start of the character "あ" is to be rendered. Likewise, an intermediate code stored at address b indicates that only a portion of height H2 from the address B of the character "あ" is to be rendered, and an intermediate code stored at address c indicates that only a portion of height H3 from the address C of the character "あ" is to be rendered. By doing so, each of the shapes of a split character need not be held and, even when the character crosses a band boundary, the shape data of one character has only to be held. Therefore, a storage area can be saved.

In the example shown in FIG. 3, the shape data of a clipped character is stored in the intermediate code buffer 15. Of course, the shape data of a clipped character may be stored in the font cache buffer 13. FIG. 5 illustrates an example of clipping. The term clipping refers to the rendering of only a portion within a given area in a figure or a character. For example, when the character "あ" as shown in FIG. 5A is given, clipping an area enclosed in a bold line as shown in FIG. 5B causes rendering processing to be performed as shown in FIG. 5C. Of course, the clipping is not limited to characters, and performs the same processing for figures and images also. When a character is clipped, shape data obtained as a result of clipping as shown in FIG. 5C is stored in the intermediate code buffer 15, in the example shown in FIG. 3, for example.

For clipping in a fast-scanning direction, by having intermediate codes hold information about reference to character shape data and width and height information as shown in FIG. 4, the character shape data in the font cache buffer 13 can be used. This eliminates the need to store the shape data of a clipped character in the intermediate code buffer 15, contributing to reducing the amount of memory used in the intermediate code buffer 15.

When character data to render a new character is inputted, the font cache buffer 13 and the intermediate code buffer 15 are searched for the shape data of the character. If not found, while character shape data is newly generated by the character data generation unit 12 and registered in the font cache buffer 13, data for references to and from an intermediate code of the character data is written to the font cache buffer 13 and the intermediate code buffer 15.

In this way, each time character shape data is newly generated, the generated character shape data is registered in the font cache buffer 13. Where there are many pieces of character shape data to be generated, as they are registered, the font cache buffer 13 runs out of free space to register them. In such a case, expelling processing is performed to save to the intermediate code buffer 15 character shape data selected according to a predetermined method from character shape data (or including character shape data newly registered) registered in the font cache buffer 13.

FIG. 6 illustrates an example of the relationship between character shape data stored in the font cache buffer and intermediate codes stored in the intermediate code buffer after expelling processing in the first embodiment of the image processing apparatus and image processing method of the present invention. For example, assume that the shape data of a character "い" is newly generated when there is no free space in the font cache buffer 13. In this case, expelling processing is performed according to the flowchart shown in FIG. 2. The example shown in FIG. 6 shows the case where the shape data of the character "あ" already registered in the font cache buffer 13 is selected by a predetermined method and is saved to the intermediate code buffer 15.

The selected shape data of the character "あ", after the intermediate code buffer 15 is checked for free space capacity, is transferred from the font cache buffer 13 to the intermediate code buffer 15. The character shape data can be transferred to the intermediate code buffer 15. At the same time, according to information about reference to intermediate codes, added to the shape data of the character "あ", reference information for referencing the shape data of the character "あ", added to the intermediate codes, is updated. Thereby, a mutual reference relationship between the character shape data and the intermediate codes is maintained. Since such a mutual reference relationship is maintained, when the character shape data is transferred to the intermediate code buffer 15, reference information added to the intermediate codes can be updated based on reference information added to the character shape data. This eliminates the need to search the intermediate code buffer 15, enabling rapid expelling processing.

After the shape data of the character "あ" is thus transferred from the font cache buffer 13 to the intermediate code buffer 15, the font cache buffer 13 is checked for free space capacity, and if it is available for registration, the shaped data of the character "い" newly generated is stored in the font cache buffer 13. Information about references to and from an intermediate code to render the character "あ" is written to the shape data and the intermediate code. This makes a state as shown in FIG. 6.

Character shape data expelled to the intermediate code buffer 15 is deleted, for example, at the point where no reference has been made from intermediate codes. Or the character shape data is deleted when the intermediate code buffer 15 is updated each time an image is rendered in a specified unit such as one page.

If character shape data selected as shape data to be expelled from the intermediate code buffer 15 is not referenced from intermediate codes, it may be deleted from the font cache buffer 13 without being transferred to the intermediate code buffer 15.

In the process of the above-described expelling processing, the intermediate code buffer 15 may have no free space large enough to store character shape data to be expelled from the font cache buffer 13. The intermediate code buffer 15 may be filled in the course of registering intermediate codes in it regardless of characters. In such a case, fallback processing is performed to generate a free space in the intermediate code buffer 15.

FIGS. 7A and 7B illustrate a first example of fallback processing. (1) to (4) in the figure designate objects to be rendered, respectively. FIG. 7A shows overlapped rendered objects. That is, the objects (1) and (2) are rendered before the object (3) overwrites the object (1), and then overwritten with the object (4).

As the objects are overwritten in this way, figures rendered according to the objects (1) to (3) are deleted by rendering the object (4). Accordingly, rendering results are equivalent to the case of rendering only the object (4) as shown in FIG. 7B. The description here assumes that the rendered objects are opaque.

Thus, earlier objects wholly contained in a rendering area of an object to be rendered later can be deleted because they need not be rendered. Taking advantage of this property, intermediate codes in such a relationship as found in the objects (1) to (3) in FIGS. 7A and 7B can be deleted after searching the intermediate code buffer 15 for them. Thereby, the free space capacity of the intermediate code buffer 15 can be increased.

FIG. 8 illustrates a second example of fallback processing. In this example, rendering processing is actually performed based on all or part of intermediate codes at the time of fallback processing, stored in the intermediate code buffer 15. Then, the intermediate codes having performed the rendering processing are deleted from the intermediate code buffer 15. Rendering results produced by the fallback processing are not a final rendered image but an intermediate rendered image. Such a rendered image is stored in, e.g., the band buffer 6. In an example shown in FIG. 8, compression processing is further performed to form a compressed image and can be stored in the band buffer 6 or a compression band buffer separately provided. In the intermediate code buffer 15 are stored intermediate codes including reference information for referencing the rendered image or compressed image. Since the rendered intermediate codes can be deleted by the fallback processing, the free space capacity of the intermediate code buffer 15 can be significantly increased.

The intermediate rendered image or compressed image generated in this way is hereinafter treated as image data, and is rendered in overwritten form by intermediate codes registered later for the image. Finally, upon completion of rendering an object of, e.g., one page, almost the same image as produced when rendering processing is performed in sequence from the first intermediate code is obtained. Nonreversible compression reduces image quality a little. However, the fallback processing is exceptionally performed when the intermediate code buffer 15 runs out of free space, and can be performed less frequently if the capacity of the intermediate code buffer 15 is increased.

Figure 9:
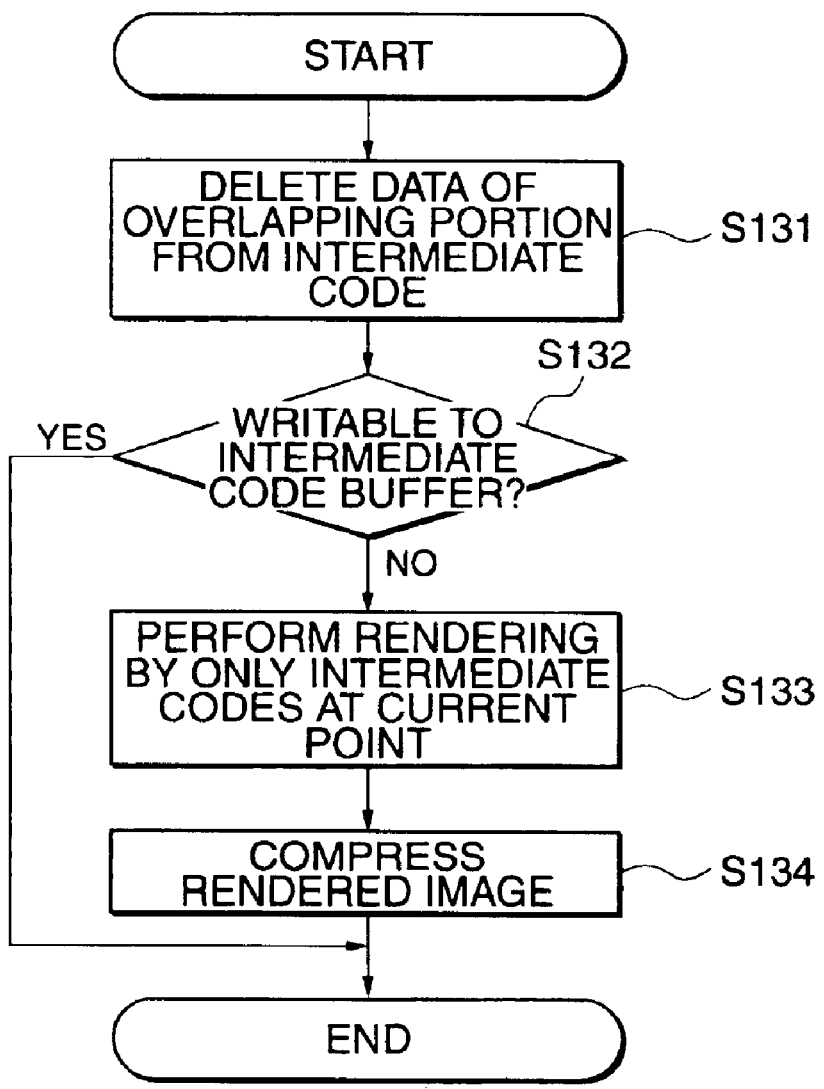
FIG. 9 is a flowchart showing an example of fallback processing in the image processing apparatus and image processing method of the present invention.

FIG. 9 is a flowchart showing an example of fallback processing in the image processing apparatus and image processing method of the present invention. In this example, the first example of fallback processing shown in FIGS. 7A and 7B is performed, and if a free space is still insufficient, the second example of fallback processing shown in FIG. 8 is performed. Of course, either of them may be performed. The processing shown in FIG. 9 can be performed in S117 of FIG. 2.

In S131, as shown in FIGS. 7A and 7B, intermediate codes corresponding to earlier objects rendered, wholly overlapped with a later object are deleted from the intermediate code buffer 15. By this processing, some amount of a free space can be allocated in the intermediate code buffer 15.

In S132, it is determined whether writing to the intermediate code buffer 15 has become possible by allocating a free space in S131. If writing is possible, the fallback processing terminates.

If writing to the intermediate code buffer 15 still cannot be performed, that is, free space capacity is still insufficient, fallback processing is performed by the method shown in FIG. 8. In S133, rendering processing is performed according the contents of intermediate code buffer 15 at current point and an intermediate rendered image is generated. The intermediate codes having performed the rendering processing are deleted from the intermediate code buffer 15. Furthermore, in S134, the rendered image is compressed to generate a compressed image. The compression processing in S134 may be omitted. Intermediate codes including reference information for referencing the rendered image or compressed image thus generated are stored in the intermediate code buffer 15. In this way, the fallback processing can be performed.

Figure 10:
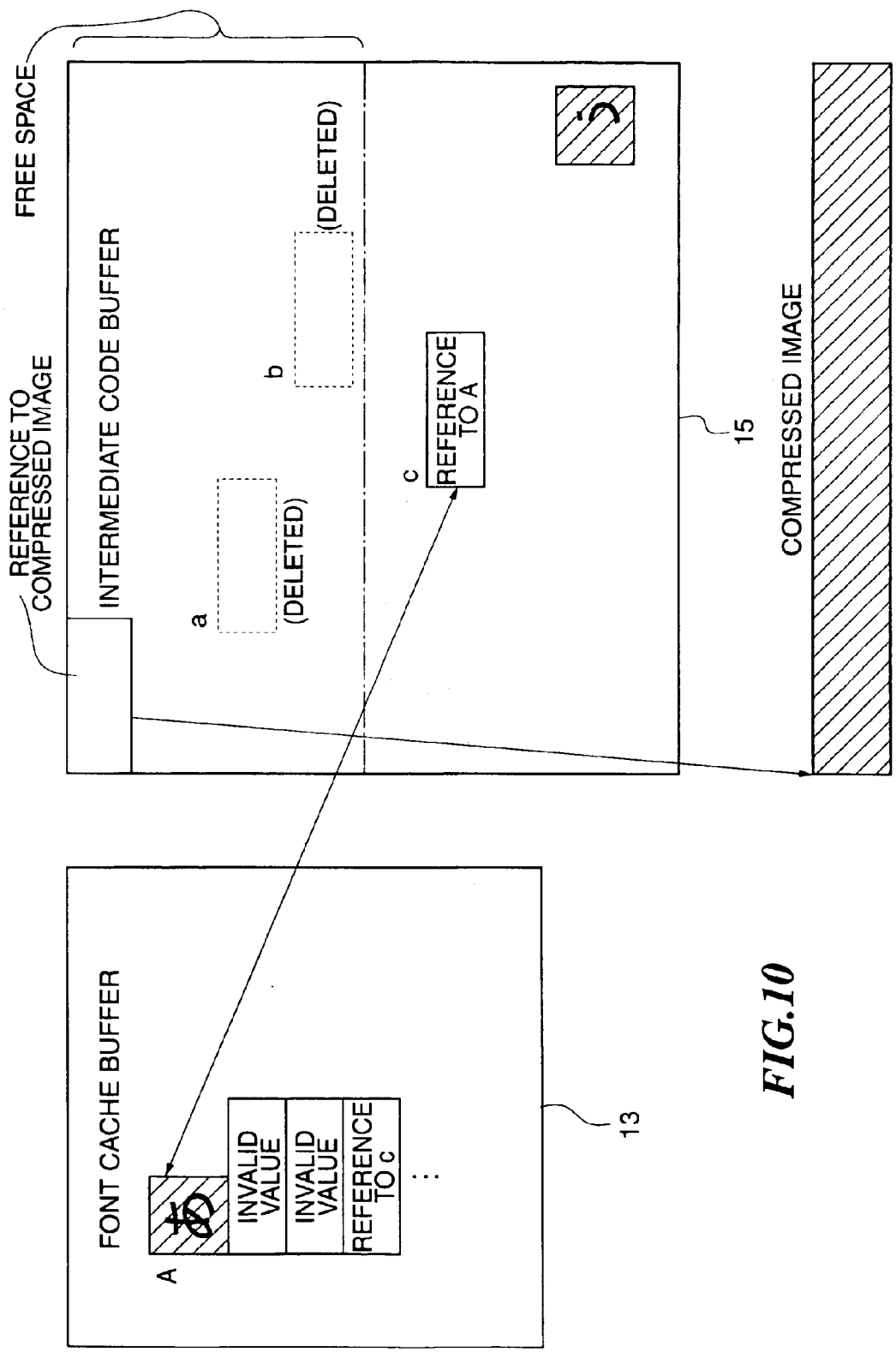
FIG. 10 illustrates an example of the relationship between character shape data stored in the font cache buffer and intermediate codes stored in the intermediate code buffer after fallback processing in the first embodiment of the image processing apparatus and image processing method of the present invention.

FIG. 10 illustrates an example of the relationship between character shape data stored in the font cache buffer and intermediate codes stored in the intermediate code buffer after fallback processing in the first embodiment of the image processing apparatus and image processing method of the present invention. FIG. 10 shows the case where fallback processing has been performed because the intermediate code buffer 15 runs out of free space in the state shown in FIG. 3. In this example, fallback processing is performed by the method shown in FIG. 8 for intermediate codes in a portion from the top to a dashed line in the intermediate code buffer 15 in FIG. 10. That is, rendering processing is performed according to the intermediate codes in the portion from the top to a dashed line in the intermediate code buffer 15 in FIG. 10 to generate an intermediate rendered image. The rendered image is compressed to obtain a compressed image shown in the lower part of FIG. 10.

The intermediate codes having performed the rendering processing are deleted. Intermediate codes to render characters have a mutual reference relationship with character shape data. To delete the intermediate codes to render characters, reference information of character shape data referencing the intermediate codes to be deleted is changed to an invalid value as shown in FIG. 10. Or the reference information may be deleted. In this way, the reference relationship between the intermediate codes to be deleted and the character shape data is invalidated.

By performing the rendering processing sequentially to delete intermediate codes, a large free space is generated in the intermediate code buffer 15. In the vacated area are stored intermediate codes including reference information for referencing an intermediate rendered image or a compressed image resulting from compressing the rendered image. As a result, the contents of the font cache buffer 13 and the intermediate code buffer 15 are as shown in FIG. 10. The portion above the dashed line in the intermediate code buffer 15 is turned into a free space by the fallback processing.

Also during ordinary rendering processing, the same processing as the above-described fallback processing can be performed for reference information added to character shape data. That is, for intermediate codes having performed character rendering processing, reference information of character shape data referencing the intermediate codes is changed to an invalid value or deleted. This nullifies the reference relationship between the intermediate codes having performed rendering processing and the character shape data. Or after rendering processing has been performed in a specified unit such as one page or one band, reference information added to character shape data may be updated collectively.

As has been described above, in the first embodiment of the present invention, by providing a mutual reference relationship between character shape data and intermediate codes, in comparison with copying character shape data for each intermediate code, the intermediate codes can be more rapidly registered and the intermediate code buffer 15 can be used more effectively. In a configuration in which only reference to character shape data from intermediate codes is made, the intermediate code buffer 15 need not be searched, e.g., during expelling processing, so that more rapid expelling processing can be performed.

Next, a description is made of a second embodiment of the image processing apparatus and image processing method of the present invention. The second embodiment is almost the same as the above-described first embodiment in configuration and operation; examples of the configuration shown in FIG. 1 and the operation shown in FIG. 2 can be applied. In the second embodiment, a data structure representing a reference relationship between character shape data and intermediate codes referencing the character shape data is different from that in the first embodiment.

Figure 11:
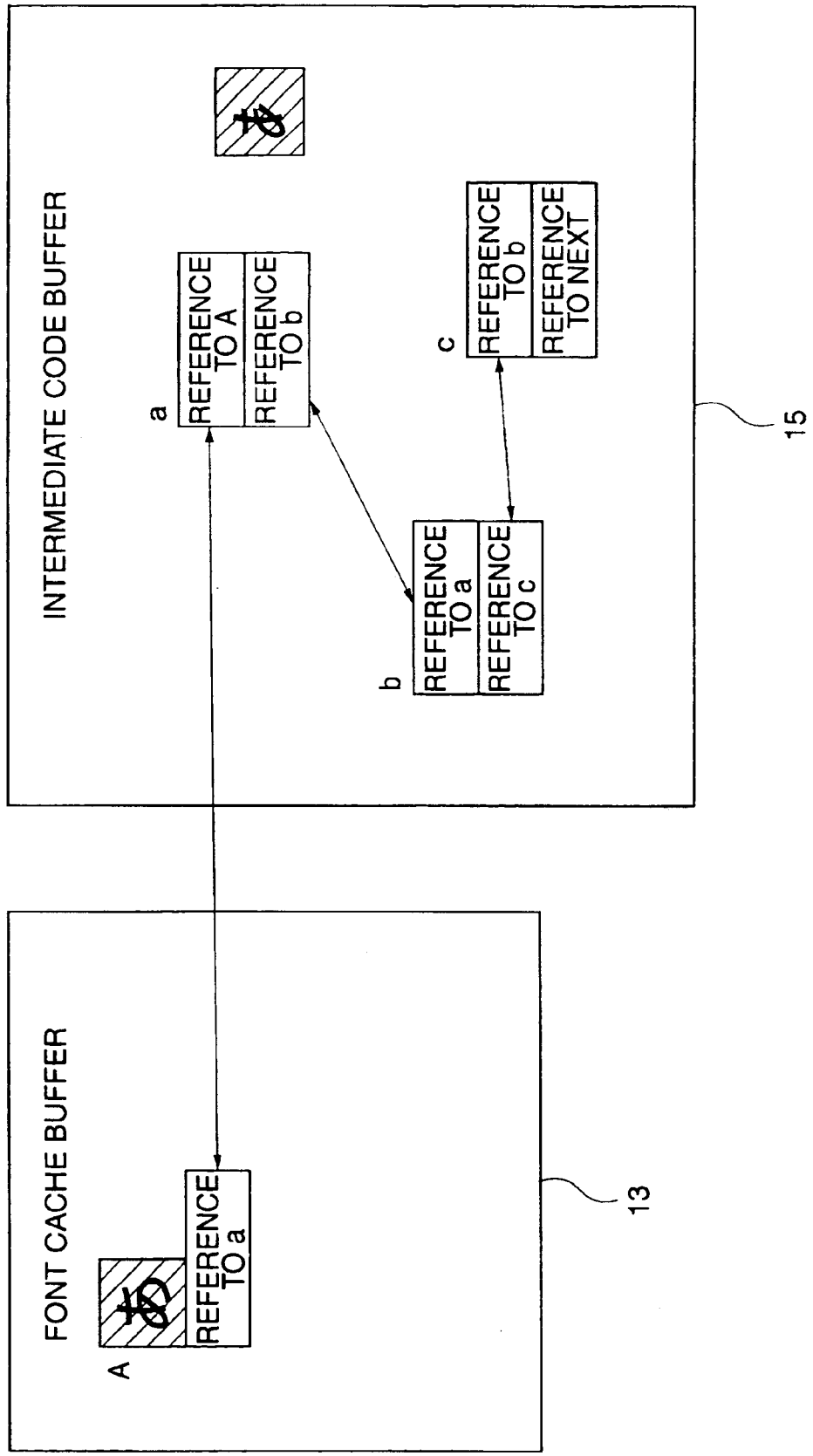
FIG. 11 illustrates an example of the relationship between character shape data stored in the font cache buffer and intermediate codes stored in the intermediate code buffer in the second embodiment of the image processing apparatus and image processing method of the present invention.

FIG. 11 illustrates an example of the relationship between character shape data stored in the font cache buffer and intermediate codes stored in the intermediate code buffer in the second embodiment of the image processing apparatus and image processing method of the present invention. In the second embodiment, the character shape data stored in the font cache buffer 13 is mutually connected with one or more intermediate codes referencing the character shape data in the intermediate code buffer 15 so that a mutual reference list structure with the character shape data as one end is formed.

For example, as shown in FIG. 11, when the shape data of the character "あ" and three intermediate codes referencing the shape data of the character "あ" exist, the shape data of the character "あ" is associated with reference information (address a in the example shown in FIG. 11) for referencing one of the intermediate codes. An intermediate code stored at address a is associated with reference information (address A) for referencing the shape data of the character "あ" and is associated with reference information (address b) for referencing one of other intermediate codes. Furthermore, an intermediate code stored at address b is associated with reference information (address a) for referencing an intermediate code referencing the intermediate code and is associated with reference information (address c) for referencing one of further other intermediate codes. Likewise, an intermediate code stored at address c is associated with reference information (address b) for referencing the intermediate code at address c and reference information for referencing one of other intermediate codes. In this way, a data structure is formed in which the shape data of the character "あ" is coupled with intermediate codes mutually having reference information so that a list structure with the shape data of the character "あ" as one end is formed.

If a new intermediate code is to render an existing character, the intermediate code may be included in the list. As in the example shown in FIG. 11, for example, a new intermediate code can be inserted between the shape data of the character "あ" and the intermediate code referencing the shape data, stored at address a. At this time, reference information for referencing the character shape data in the intermediate code stored at address a is changed to reference information for referencing the new intermediate code. Reference information of the shape data of the character "あ" is updated to reference information for referencing the new intermediate code. Moreover, in the new intermediate code are stored reference information for referencing the shape data of the character "あ" and reference information (address a) for referencing the intermediate code stored at address a. Of course, the new intermediate code need not be inserted immediately after the character shape data; it can be inserted and connected at any position such as the end of the list.

As in the above-described first embodiment, to provide for rendering processing, e.g., on a band basis, when character shape data is split on band boundaries, as shown in FIG. 4, information such as reference position, width, and height of split shape data is preferably added to intermediate codes. In the example shown in FIG. 11, the shape data of a clipped character is stored in the intermediate code buffer 15. Of course, the shape data of a clipped character may also be stored in the font cache buffer 13, and during clipping in a fast-scanning direction, as in the case of the above-described split on band boundaries, processing may be performed to reference the shape data of characters not clipped.

FIG. 12 illustrates an example of the relationship between character shape data stored in the font cache buffer and intermediate codes stored in the intermediate code buffer after expelling processing in the second embodiment of the image processing apparatus and image processing method of the present invention. FIG. 12 shows that the shape data of the character "あ" is expelled in the state in FIG. 11 and stored in the intermediate code buffer 15.

In the second embodiment, the expelling processing can be very easily performed. That is, as shown in FIG. 12, after the shape data of the character "あ" is stored in the intermediate code buffer 15, the reference relationship is maintained by simply changing reference information of an intermediate code (the intermediate code stored at address a) referencing the shape data of the character "あ" The character shape data may be stored in the intermediate code buffer 15 while holding the same font, character code, and other information as it had when stored in the font cache buffer 13.

In this way, even when expelling processing has been performed, since reference information can be changed only in one intermediate code, processing can be performed faster than the conventional processing of searching the intermediate code buffer 15 and the case of changing reference information of plural intermediate codes as in the above-described first embodiment.

Figure 13:
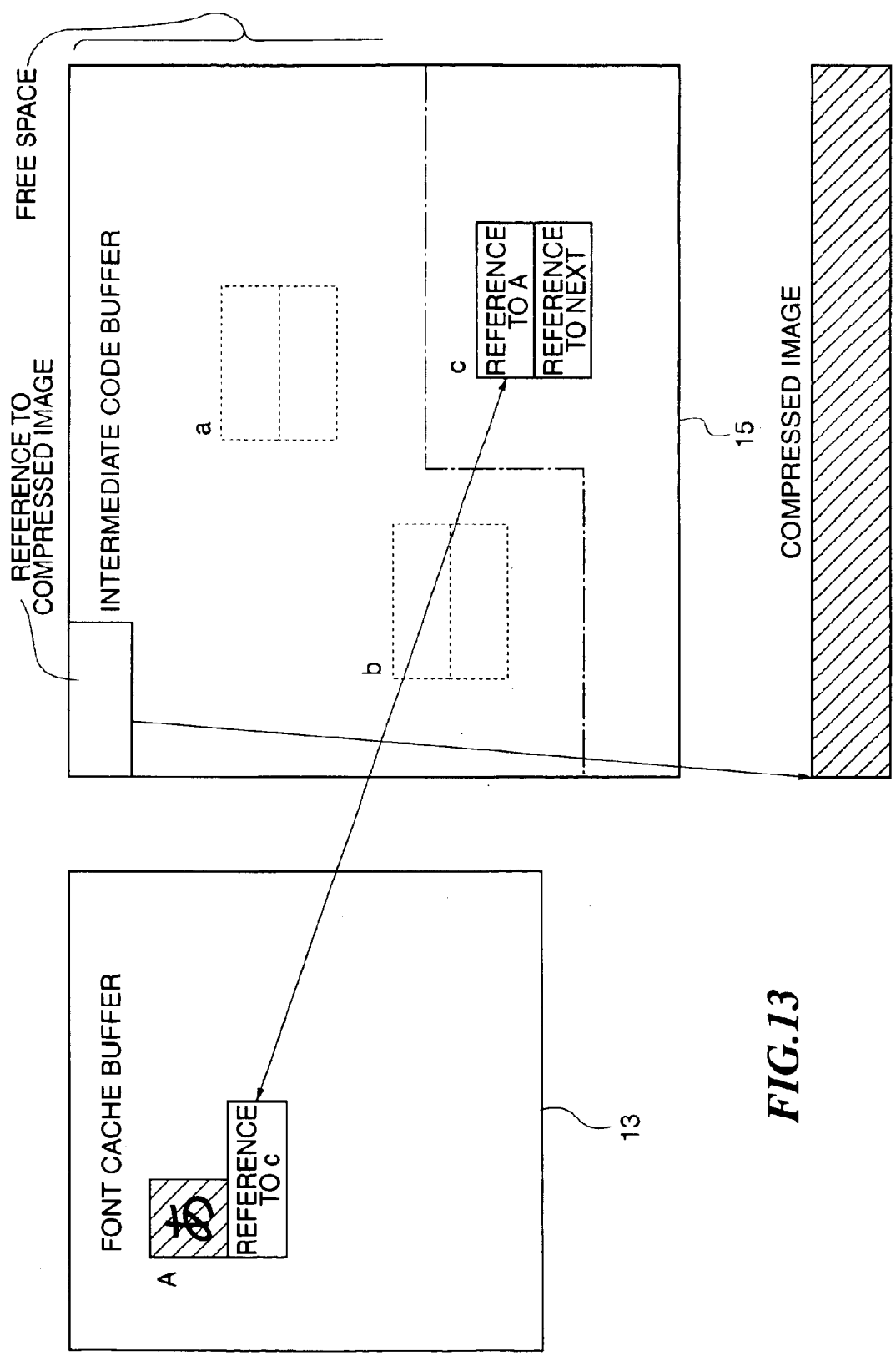
FIG. 13 illustrates an example of the relationship between character shape data stored in the font cache buffer and intermediate codes stored in the intermediate code buffer after fallback processing in the second embodiment of the image processing apparatus and image processing method of the present invention.

FIG. 13 illustrates an example of the relationship between character shape data stored in the font cache buffer and intermediate codes stored in the intermediate code buffer after fallback processing in the second embodiment of the image processing apparatus and image processing method of the present invention. FIG. 13 shows an example that, in the state in FIG. 11, fallback processing is performed for intermediate codes stored above the dashed line as shown in FIG. 13 by the method described in FIG. 8.

Herein, the intermediate codes having been stored at addresses a and b shown in FIG. 11 have been deleted after performing rendering processing. In this case, to intermediate codes before and after an intermediate code to be deleted, by writing reference data associated respectively with them, the intermediate code can be deleted with the mutual reference list structure maintained. For example, when deleting the intermediate code stored at address a shown in FIG. 11, reference information for referencing the intermediate code stored at address a of an intermediate code stored at address b is updated with reference information for referencing the shape data of the character "あ". Reference information for referencing the intermediate code stored at address b is written as reference information of the shape data of the character "あ". Thereby, the shape data of the character "あ" references the intermediate code stored at address b, and, in turn, the intermediate code stored at address b references the shape data of the character "あ" In the same way, if the intermediate code stored at address b is also deleted, as shown in FIG. 13, the shape data of the character "あ" and an intermediate code stored at address c are mutually referenced.

In this way, deletion of intermediate codes by fallback processing can be easily made, with a data structure maintained, by simply updating reference information of intermediate codes and character shape data directly referenced by the intermediate codes to be deleted.

Also during ordinary rendering processing, the same processing as the above-described fallback processing can be performed for reference information added to character shape data and reference information added to intermediate codes. That is, for an intermediate code having performed character rendering processing, reference information of character shape data and an intermediate code, referenced by two pieces of reference information added to the intermediate code, is respectively updated. Thereby, the intermediate code having performed the rendering processing becomes deletable, removed from the mutual reference list. Or after rendering processing has been performed in a specified unit such as one page or one band, reference information added to character shape data and intermediate codes may be updated collectively.

Figure 14:
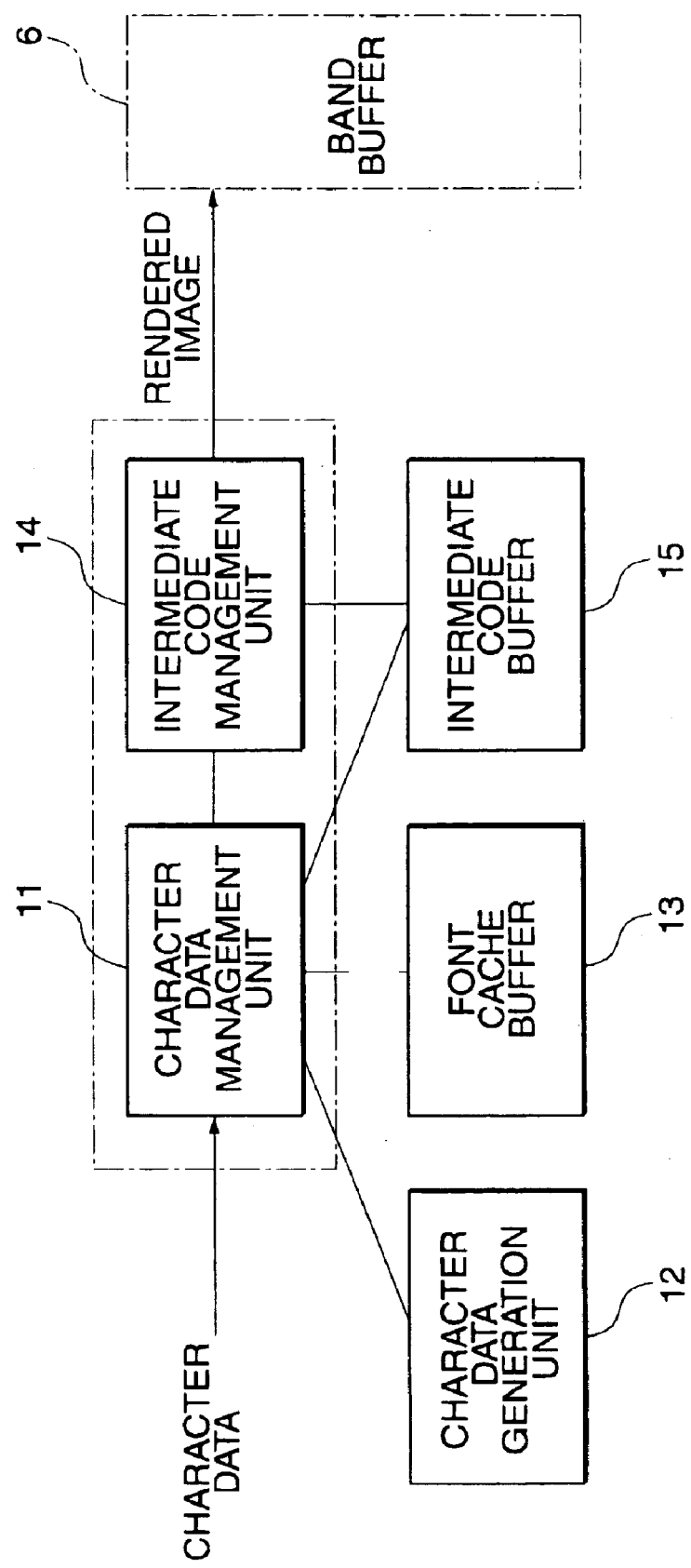
FIG. 14 is a block diagram showing a third embodiment of the image processing apparatus of the present invention.

FIG. 14 is a block diagram showing a third embodiment of the image processing apparatus of the present invention. Reference numbers in the figure are the same as those of FIG. 20. FIG. 14 also shows a configuration for implementing a third embodiment of the image processing method of the present invention. Also in the third embodiment, the character data management unit 11 and the intermediate code management unit 14 form a management unit. The intermediate code buffer 15 forms a code information storage part; the font cache buffer 13, a font storage part; and the character data generation unit 12, a character data generation part. Character data in FIG. 14 may be input data to render characters as described above or data corresponding to the above-described intermediate codes. Intermediate codes in FIG. 14 correspond to code information.

In the third embodiment, when character data is inputted, the character data management unit 11 searches the intermediate code buffer 15 for the shape data of a character indicated by the character data. If the shape data of a character indicated by the character data is already stored in the intermediate code buffer 15, the character data management unit 11 passes an intermediate code including reference information for referencing the character shape data to the intermediate code management unit 14. If the shape data of a character indicated by the character data is not stored in the intermediate code buffer 15, the character data management unit 11 searches the font cache buffer 13 to obtain character shape data, stores the character shape data in the intermediate code buffer 15, and stores an intermediate code including reference information for referencing the character shape data in the intermediate code buffer 15. The character shape data may be stored in the intermediate code buffer 15 while holding the same font, character code, and other information as it has when stored in the font cache buffer 13. Thereby, character shape data in the intermediate code buffer 15 can be easily searched.

If the shape data of a character indicated by the character data is not stored in the font cash buffer 15, character shape data is newly generated in the character data generation unit 12 and stored in the font cache buffer 13 and the intermediate code buffer 15, and an intermediate code including reference information for referencing the character shape data stored in the intermediate code buffer 15 is stored in the intermediate code buffer 15. The character shape data and the intermediate code can be stored in the intermediate code buffer 15 via the intermediate code management unit 14. The character management unit 11 can also manage the font cache buffer 13, using any of known various management methods.

The intermediate code management unit 14 stores an intermediate code passed from the character data management unit 11 and intermediate codes passed from other processing units in the intermediate code buffer 15. The intermediate code passed from the character data management unit 11 is also stored in the intermediate code buffer 15. The intermediate code management unit 14 manages the intermediate code buffer 15, and if the intermediate code buffer 15 runs out of free space, generates a free space in the intermediate code buffer 15 by performing the above-described fallback processing. For example, when intermediate codes have been stored in the intermediate code buffer 15 in a unit such as one page, rendering processing is performed by referencing the intermediate codes and an image is outputted.

Although, in the foregoing description, the character data management unit 11 searches for character shape data existing in the intermediate code buffer 15, the present invention is not limited to this. For example, the character data management unit 11 passes character shape data to the intermediate code management unit 14 so that, if the passed character shape data is already stored in the intermediate code buffer 15, the intermediate code management unit 14 changes reference information for referencing the character shape data already stored to character shape information and stores it in the intermediate code buffer 15.

In this way, in the third embodiment, character shape data is put in the intermediate code buffer 15 but not stored duplicately therein, and reference information for referencing the character shape data is added to each intermediate code. Thereby, the intermediate code buffer 15 is reduced in the amount of use and can be effectively used.

Figure 15:
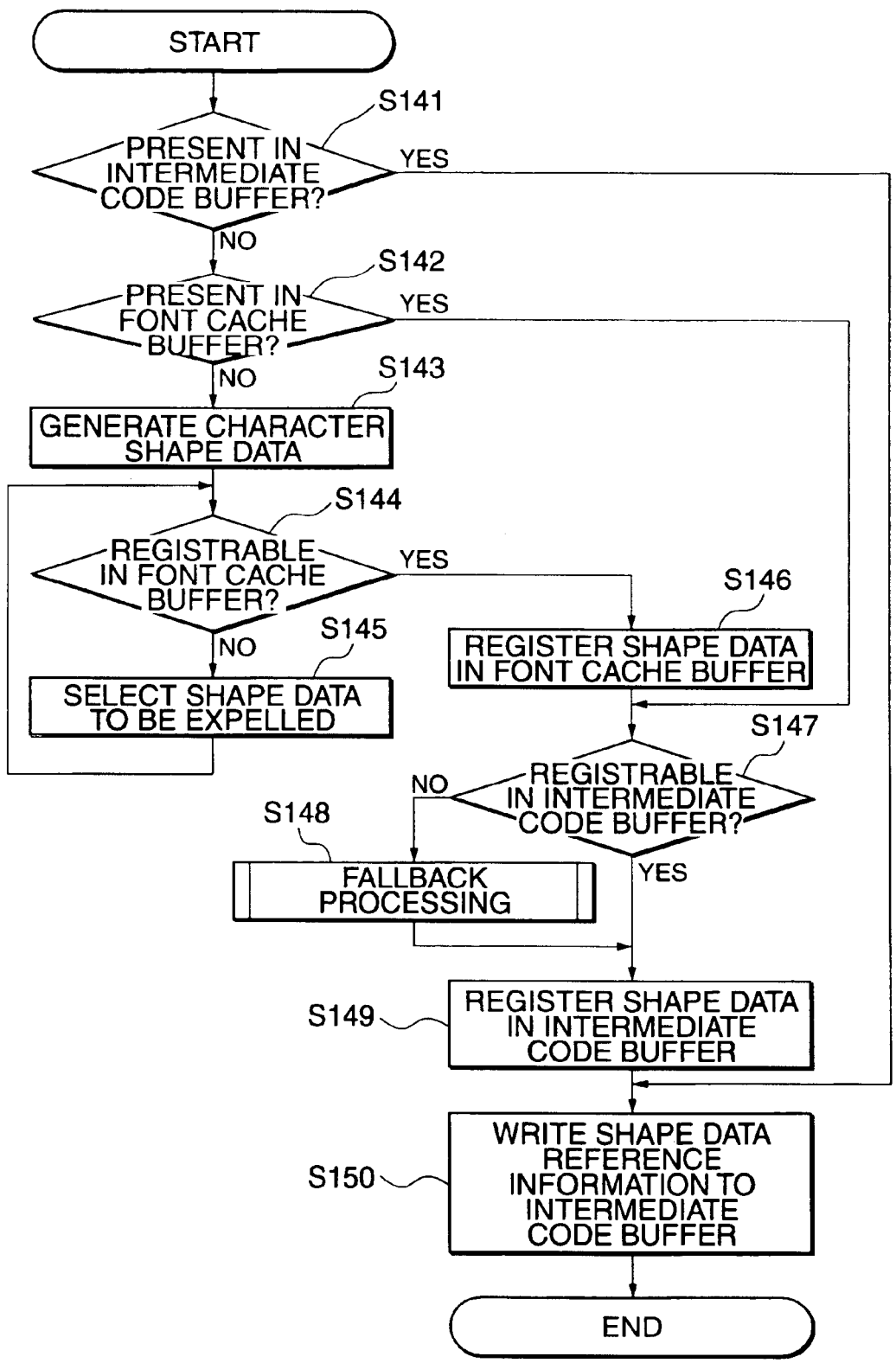
FIG. 15 is a flowchart showing an example of the operation of the image processing apparatus of the present invention in the third embodiment.

FIG. 15 is a flowchart showing an example of the operation of the image processing apparatus of the present invention in the third embodiment. FIG. 15 also shows the third embodiment of the image processing method of the present invention. When character data is inputted to the character data management unit 11, in S141, the intermediate code buffer 15 is searched for the shape data of a character indicated by the character data. At this time, if the character shape data is provided with information such as font and character code, it can be easily searched for. If a match is found, control proceeds to S150, where reference information for referencing the found character shape data is written to the intermediate code buffer 15 along with an intermediate code via the intermediate code management unit 14.

If the shape data of the character indicated by the inputted character data does not exist in the intermediate code buffer 15, in S142, the font cache buffer 13 is searched for the character shape data. If it exists in the font cache buffer 13, control proceeds to S147, where processing is performed to store the character shape data in the intermediate code buffer 15.

If the shape data of the character indicated by the inputted character data exists neither in the font cache buffer 13 nor in the intermediate code buffer 15, in S143, the shape data of the character indicated by the character data is generated in the character data generation unit 12. In S144, it is determined whether the character shape data newly generated can be registered in the font cache buffer 13. If the font cache buffer 13 has no free space large enough to register the character shape data newly generated, in S145, expelling processing is performed to selectively delete character shape data of low priority in the font cache buffer 13 by a predetermined method. Control returns to S144, where it is determined whether the font cache buffer 13 has a free space. The expelling processing in S145 is repeated once or plural times to allocate a free space large enough to register the character shape data newly generated in S143. If the font cache buffer 13 has a free space large enough to register the character shape data newly generated or has a free space as a result of the expelling processing, in S146, the character shape data newly generated is registered in the font cache buffer 13.

Before proceeding to the next step to store the character shape data in the intermediate code buffer 15, it is determined in S147 whether the character shape data can be stored in the intermediate code buffer 15. If the intermediate code buffer 15 has no free space large enough to store the character shape data, in S148, fallback processing is performed to create a free space in the intermediate code buffer 15. The fallback processing is performed as described in the above-described first embodiment.

When a free space exists in the intermediate code buffer 15 or after a free space is allocated by the fallback processing in, S148, in S149, the character shape data stored in the font cache buffer 13 or the character shape data newly generated is stored in the intermediate code buffer 15. The character shape data is stored in the intermediate code buffer 15 while holding the same font, character code, and other information as it had when stored in the font cache buffer 13. In S150, the intermediate code including reference information for referencing the character shape data stored in the intermediate code buffer 15 is stored in the intermediate code buffer 15. This terminates processing for one piece of character data.

In this way, the shape data of a character indicated by inputted character data and the intermediate code including reference information for referencing the character shape data are stored in the intermediate code buffer 15. At this time, for the same character, only one piece of shape data is stored in the intermediate code buffer 15 and intermediate codes using the character shape data are associated with reference information for referencing the character shape data. Therefore, a large number of pieces of the shape data of same characters are not put in the intermediate code buffer 15 as they have been in conventional intermediate code buffers, so that the intermediate code buffer 15 can be effectively used.

Although not shown in the above-described flowchart, if the intermediate code buffer 15 has no free space not only when character shape data is stored in the intermediate code buffer 15 but also when data is written to the intermediate code buffer 15, fallback processing is performed in S148 to increase the capacity of free space in the intermediate code buffer 15.

FIG. 16 illustrates an example of the relationship between character shape data stored in the font cache buffer and intermediate codes stored in the intermediate code buffer in the third embodiment of the image processing apparatus and image processing method of the present invention. As described above, in the third embodiment, character shape data is stored in the intermediate code buffer 15 aside from the font cache buffer 13. At this time, the character shape data to be stored in the intermediate code buffer 15 is provided with the same font, character code, and other information as it has when stored in the font cache buffer 13. To intermediate codes to render by using the character shape data, reference information for referencing the character shape data in the intermediate code buffer 15 is added. Thereby, as shown in FIG. 16, intermediate codes to render, e.g., the character "あ" are provided with reference information for referencing the shape data of the character "あ" in the intermediate code buffer 15 so, that the intermediate codes can reference the shape data without having the entity of the character shape data.

By adopting such a data structure, the font cache buffer 13 and the intermediate code buffer 15 can be managed independent of each other. Hence, without being influenced by a method for managing the font cache buffer 13, the intermediate code buffer 15 is reduced in the amount of data and can be effectively used.

When character shape data is split on band boundaries, as shown in FIG. 4, preferably, information such as width and height is added to intermediate codes, and split positions of the character shape data are held as reference positions. In the example shown in FIG. 16, for the shape data of a clipped character, the shape data of the clipped character is added to intermediate codes. Of course, for the shape data of a clipped character, as described above, the character shape data and the intermediate codes may be stored in the intermediate code buffer 15 and reference information for referencing the character shape data may be added to the intermediate codes. During clipping in a fast-scanning direction, as in the case of the above-described split on band boundaries, processing may be performed to reference the shape data of characters not clipped.

FIG. 17 illustrates an example of the relationship between character shape data stored in the font cache buffer and intermediate codes stored in the intermediate code buffer after expelling processing in the third embodiment of the image processing apparatus and image processing method of the present invention. As described above, in the third embodiment, the font cache buffer 13 and the intermediate code buffer 15 can be managed independent of each other. Therefore, where expelling processing is to be performed because the font cache buffer 13 runs out of free space, the conventional method is used by which character shape data of low priority is deleted to register newly generated character shape data in a vacated area. In the expelling processing, no operation needs to be performed on the intermediate code buffer 15. Consequently, the expelling processing can be performed more easily and faster than in the above-described two embodiments.

FIG. 18 illustrates an example of the relationship between character shape data stored in the font cache buffer and intermediate codes stored in the intermediate code buffer after fallback processing in the third embodiment of the image processing apparatus and image processing method of the present invention. FIG. 18 shows an example that, because the intermediate code buffer 15 runs out of free space in the state in FIG. 16, fallback processing is performed, by the method described in FIG. 8, for intermediate codes stored above a dashed line in the intermediate code buffer 15 as shown in FIG. 18. That is, rendering processing is performed according to the intermediate codes in the portion from the top to the dashed line in the intermediate code buffer 15 in FIG. 18 to generate an intermediate rendered image. The rendered image is compressed to obtain a compressed image shown in the lower part of FIG. 18. An intermediate code including reference information for referencing the rendered image or compressed image is stored in the intermediate code buffer 15.

In the fallback processing, the intermediate codes having performed the rendering processing are deleted. Character shape data existing in an area subject to fallback processing is not deleted. Accordingly, even if intermediate codes existing in an area not subject to rendering processing reference character shape data, a reference relationship among them is not lost. Character shape data is subjected to rendering processing in a unit of, e.g., one page, and when the intermediate code buffer 15 is deallocated, an area of the character shape data is also deallocated and becomes unusable.

As described above, in the third embodiment, character shape data is stored in the intermediate code buffer 15, and reference information for referencing the character shape data is associated with intermediate codes. Thereby, compared with the case where each intermediate code is provided with character shape data, the amount of intermediate codes is reduced and the intermediate code buffer 15 can be effectively used.

Figure 19:
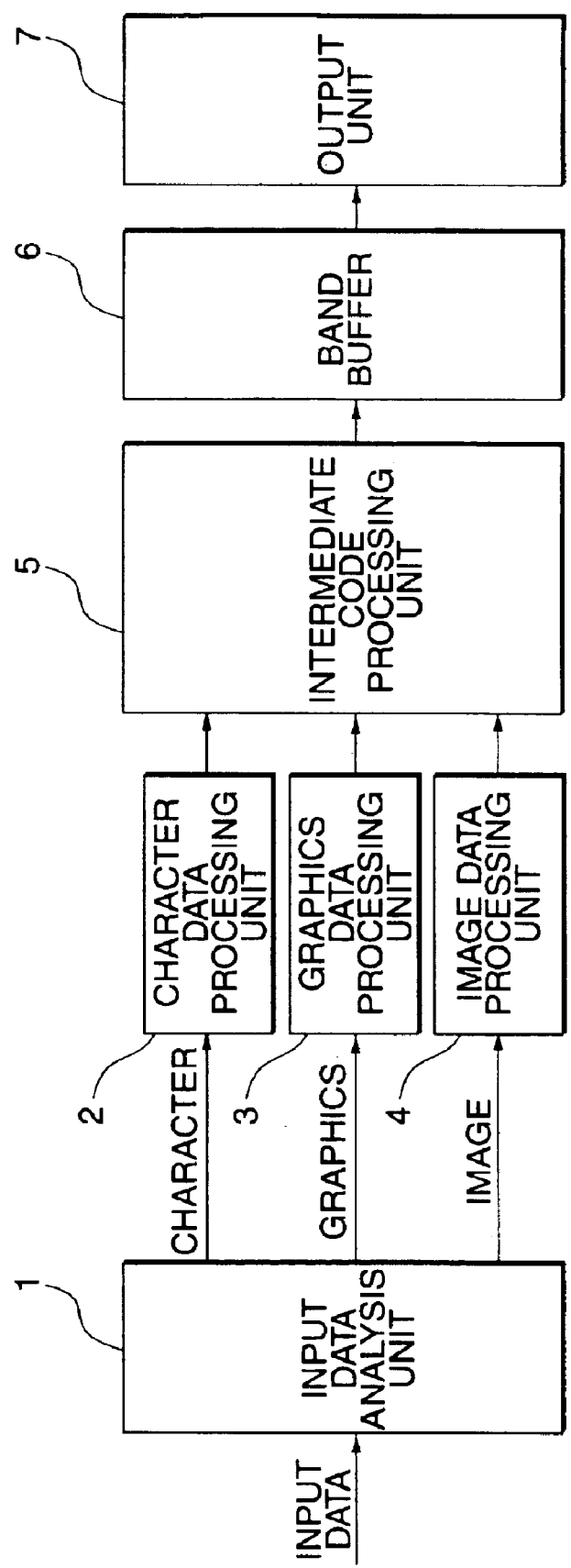
FIG. 19 is a block diagram showing an example of a general image forming apparatus.

The above-described first or third embodiment can apply to, e.g., an image forming apparatus. In application to the image forming apparatus as shown in FIG. 19, as a character data processing unit 2 and an intermediate code processing unit 5, the image processing apparatus of the present invention may be incorporated or the image processing method of the present invention may be applied. Thereby, a memory to store intermediate codes can be effectively used and input data to render characters can be rapidly processed. Consequently, processing of the entire image forming apparatus can be sped up.

As has been described above, according to the present, character shape data is stored separately from code information and reference information for referencing the character shape data is added to the code information, whereby a data amount in the code information storage unit is reduced and the code information storage unit can be effectively used. To enable mutual references between the character shape data and each piece of code information, both of them can be provided with information for referencing each other. Thereby, for example, during expelling processing to transfer character shape data from the font storage unit to the code information storage unit, or fallback processing to increase a free space in the code information storage part, reference information of code information referencing character shape data can be easily and rapidly updated. Moreover, by forming character shape data and code information referencing the character shape data in a mutual reference list structure, e.g., expelling processing and fallback processing can be further sped up. The present invention provides such effects and various effects as described above in detail.

What is claimed is:

1. An image processing apparatus, comprising:
   a code information storage part that stores code information for rendering;
   a font storage part that stores character shape data; and
   a management part that receives the code information and stores the information in the code information storage part,
   wherein the management part, for code information indicating a character, stores, in the code information storage part, reference information for referencing shape data of the character within the font storage part and stores, in the font storage part, the reference information pointing to the code information referencing the character shape data in association with the shape data of the character.

2. The image processing apparatus according to claim 1, further comprising:
   a character data generation part that generates character shape data, wherein the management part, according to code information indicating a new character, generates shape data of the new character by the character data generation part and stores the data in the font storage part.

3. The image processing apparatus according to claim 2, wherein the management part, when storing the character shape data generated by the character data generation part in the font storage part, if there is no free space in the font storage part, transfers the character shape data stored in the font storage part and reference information pointing to code information referencing the shape data to the code information storage part, and modifies the reference information for referencing the shape data, stored in the code information storage part, in association with code information referencing the shape data.

4. The image processing apparatus according to claim 1, wherein the management part, when the code information storage part runs out of a free space to store the code information, deletes code information for rendering from the code information stored in the code information storage part before being replaced by code information for subsequent rendering, so as to increase free space of the code information storage part, while if the deleted code information indicates a character, invalidates reference information pointing to the code information from among character shape data corresponding to the code information.

5. The image processing apparatus according to claim 1, wherein the management part, when the code information storage part runs out of a free space to store the code information, performs rendering processing by using part or all of the code information stored in the code information storage part, deletes the code information having performed the rendering processing from the code information storage part, while if the deleted code information indicates a character, invalidates reference in formation pointing to the code information from among character shape data corresponding to the code information and stores code information pointing to rendered data generated by the rendering processing in the code information storage part.

6. The image processing apparatus according to claim 1, wherein the management part, when the code information indicates a character and is specified to render only part of the shape of the character, stores part of shape data to render the part in the code information storage part.

7. An image processing apparatus, comprising:
   a code information storage part that stores code information for rendering;
   a font storage part that stores character shape data; and
   a management part that receives the code information and stores the data in the code information storage part,
   wherein the management part mutually connects pieces of code information indicating the same character, stored in the code information storage part, as a mutual reference list including the shape data of the character stored in the font storage part.

8. The image processing apparatus according to claim 7, further comprising:

a character data generation part that generates character shape data, wherein the management part, according to code information indicating a new character, generates shape data of the new character by the character data generation part and stores the shape data in the font storage part.

9. The image processing apparatus according to claim 8, wherein the management part, when storing character shape data generated by the character data generation part in the font storage part, if there is no free space in the font storage part, transfers character shape data stored in the font storage part and reference information pointing to code information referencing the shape data to the code information storage part, and modifies reference information for referencing the shape information, stored in the code information storage part, in association with code information referencing the shape data.

10. The image processing apparatus according to claim 7, wherein the management part, when the code information storage part runs out of a free space to store the code information, deletes code information for rendering from the code information stored in the code information storage part before being replaced by code information for subsequent rendering, so as to increase the free space of the code information storage part, while if the deleted code information indicates a character, deletes the code information from the mutual reference list and modifies the reference relationship so as to maintain the mutual reference list of other pieces of code information and the character shape data.

11. The image processing apparatus according to claim 7, wherein the management part, when the code information storage part runs out of a free space to store the code information, performs rendering processing by using part or all of the code information stored in the code information storage part, deletes the code information having performed the rendering processing from the code information storage part, while if the deleted code information indicates a character, deletes the code information from the mutual reference list, modifies the reference relationship so as to maintain the mutual reference list of other pieces of code information and the character shape data, and stores code information pointing to rendered data generated by the rendering processing in the code information storage part.

12. The image processing apparatus according to claim 7, wherein the management part, when the code information indicates a character and is specified to render only part of the shape of the character, stores part of shape data to render the part in the code information storage part.

13. An image processing method that controls code information for rendering by using a code information storage part that stores the code information, and a font storage part that stores character shape data, the method comprising the steps of:

when code information indicating a character is inputted, storing, in the code information storage part, reference information for referencing the shape data of the character indicated by the code information, the shape data being stored in the font storage part; and storing, in the font storage part, reference information pointing to the code information referencing the shape data of the character in association with the shape data of the character.

14. An image processing method that controls code information for rendering by using a code information storage part that stores the code information, and a font storage part that stores character shape data, the method comprising the steps of:

when code information indicating a character is inputted, storing, in the code information storage part, reference information for referencing the shape data of the character indicated by the code information in association with the code information, the shape data being stored in the font storage part;

storing in the font storage part, reference information pointing to the code information referencing the shape data of the character in association with the shape data of the character; and when a different piece of code information indicating the same character as indicated by the code information is already stored in the code information storage part, changing reference information associated with the different piece of code information to the reference information pointing to the code information, based on the reference information stored in the font storage part in association with the shape data of the character, and storing, in the code information storage part, the reference information pointing to the different piece of code information in association with the code information.

15. An image forming apparatus that forms an image according to input data, comprising:

an input data analysis part that analyzes the input data and classifies the data by type;

a character data processing part that converts the input data to render a character classified by the input data analysis part into intermediate code information;

a font storage part that stores shape data of a character to be rendered;

one or more data processing parts, each of which converts input data to render an object other than a character into intermediate code information according to the type;

an intermediate code information storage part that stores the intermediate code information;

an intermediate code processing part that stores, in the intermediate code information storage part, the intermediate code converted by the data processing part and performs rendering processing according to the intermediate code stored in the intermediate code information storage part; and an output part that forms an image rendered by the intermediate code processing part on a recording medium, wherein the character data processing part generates intermediate code information indicating a character and passes reference information for referencing the shape data of the character along with the intermediate code information to the intermediate code information storage part to store them in the code information storage part, the shape data being stored in the font storage part, and stores, in the font storage part, reference information pointing to code information referencing the shape data of the character in association with the shape data of the character.

16. An image forming apparatus that forms an image according to input data, comprising:

an input data analysis part that analyzes input data and classifies the data by type;

a character data processing part that converts input data for rendering a character classified by the input data analysis part into intermediate code information;

a font storage part that stores shape data of the a character to be rendered;

one or more data processing parts, each of which converts input data for rendering an object other than a character into intermediate code information according to the type;

an intermediate code information storage part that stores the intermediate code information;

an intermediate code processing part that stores the intermediate code converted by the data processing part in the intermediate code information storage part and performs rendering processing according to the intermediate code stored in the intermediate code information storage part; and an output part that forms an image rendered by the intermediate code processing part on a recording medium, wherein the character data processing part mutually connects pieces of intermediate code information indicating the same character as stored in the intermediate code information storage part as a mutual reference list including the shape data of the character stored in the font storage part.

\* \* \* \* \*